(12) United States Patent
Nakanishi et al.

(10) Patent No.: US 7,702,846 B2
(45) Date of Patent: Apr. 20, 2010

(54) MEMORY CONTROLLER, NONVOLATILE STORAGE DEVICE, NONVOLATILE STORAGE SYSTEM, AND DATA WRITING METHOD

(75) Inventors: Masahiro Nakanishi, Kyoto (JP); Tomoaki Izumi, Osaka (JP); Tetsushi Kasahara, Osaka (JP); Kazuaki Tamura, Osaka (JP); Kiminori Matsuno, Osaka (JP); Yutaka Nakamura, Kyoto (JP); Masayuki Toyama, Osaka (JP); Yasushi Goho, Osaka (JP); Syunichi Iwanari, Kyoto (JP); Yoshihisa Kato, Shiga (JP); Manabu Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 293 days.

(21) Appl. No.: 11/908,715

(22) PCT Filed: Mar. 9, 2006

(86) PCT No.: PCT/JP2006/304584

§ 371 (c)(1),
(2), (4) Date: Sep. 14, 2007

(87) PCT Pub. No.: WO2006/098212

PCT Pub. Date: Sep. 21, 2006

(65) Prior Publication Data

US 2009/0055576 A1    Feb. 26, 2009

(30) Foreign Application Priority Data

Mar. 15, 2005  (JP)  ............................. 2005-073269
Apr. 28, 2005  (JP)  ............................. 2005-131785

(51) Int. Cl.
*G06F 12/12*  (2006.01)

(52) U.S. Cl. ...................... 711/103; 711/155; 711/156
(58) Field of Classification Search ...................... None
See application file for complete search history.

(56) References Cited

U.S. PATENT DOCUMENTS

| 5,524,230 A | 6/1996 | Sakaue et al. |
| 5,603,001 A | 2/1997 | Sukegawa et al. |
| 6,571,312 B1 | 5/2003 | Sugai et al. |

(Continued)

FOREIGN PATENT DOCUMENTS

JP    5-027924    2/1993

(Continued)

OTHER PUBLICATIONS

English language Abstract of JP 8-315596.

(Continued)

*Primary Examiner*—Than Nguyen
(74) *Attorney, Agent, or Firm*—Greenblum & Bernstein P.L.C.

(57) ABSTRACT

A nonvolatile storage device is provided with a nonvolatile main storage memory whose erase size is larger than a cluster size, and a buffer, i.e. a nonvolatile auxiliary storage memory. At the time of writing data in the memory, the data is temporarily stored in the buffer, then, a plurality of data in the buffer are collectively taken out to be stored in the main storage memory. Data in an original block is saved in a write block in the main storage memory. Thus, the data can be written in the main storage memory at a high speed.

6 Claims, 18 Drawing Sheets

U.S. PATENT DOCUMENTS

| | | | |
|---|---|---|---|
| 6,795,890 | B1 | 9/2004 | Sugai et al. |
| 2001/0002479 | A1 | 5/2001 | Asoh |
| 2007/0011581 | A1* | 1/2007 | Nakanishi et al. ........... 714/768 |
| 2007/0033364 | A1* | 2/2007 | Maeda et al. ............... 711/170 |
| 2007/0214309 | A1 | 9/2007 | Matsuura et al. |
| 2007/0245181 | A1* | 10/2007 | Suda .......................... 714/718 |

FOREIGN PATENT DOCUMENTS

| | | |
|---|---|---|
| JP | 7-200418 | 8/1995 |
| JP | 7-302176 | 11/1995 |
| JP | 8-315596 | 11/1996 |
| JP | 11-007505 | 1/1999 |
| JP | 2000-305862 | 11/2000 |
| JP | 2003-263894 | 9/2003 |

OTHER PUBLICATIONS

English language Abstract of JP 7-200418.
English language Abstract of JP 2000-305862.
English language Abstract of JP 11-007505.
English language Abstract of JP 7-302176.
English language Abstract of JP 2003-263894.
English language Abstract of JP 5-027924.
U.S. Patent Application No. 11/814,202 to Nakanishi et al., which was filed on Jul. 18, 2007.
U.S. Patent Application No. 11/568,564 to Kasahara et al., which was filed on Nov. 1, 2006.
U.S. Patent Application No. 11/722,362 to Nakanishi et al., which was filed on Jun. 21, 2007.
U.S. Patent Application No. 11/817,532 to Nakanishi et al., which was filed on Aug. 31, 2007.

* cited by examiner

F I G. 2

| PP | | | | | |
|---|---|---|---|---|---|
| 0 | PSA 0 | PSA 1 | PSA 2 | PSA 3 | |
| 1 | PSA 4 | PSA 5 | PSA 6 | PSA 7 | |
|  | PSA 8 | PSA 9 | PSA 10 | PSA 11 | |
| 62 | PAS 248 | PAS 249 | PAS 250 | PAS 251 | |
| 63 | PAS 252 | PAS 253 | PAS 254 | PAS 255 | |

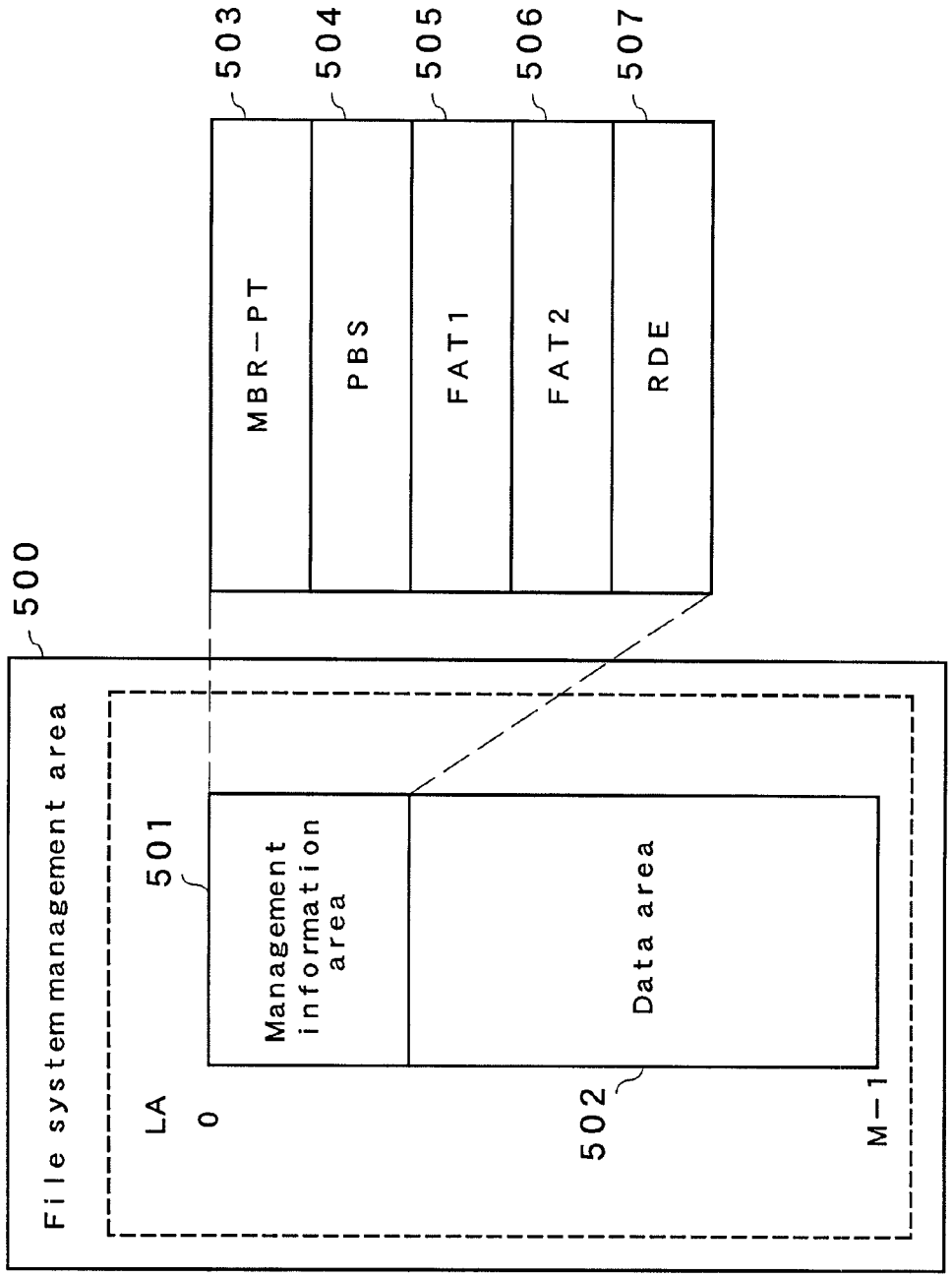

MEMORY CONTROLLER, NONVOLATILE STORAGE DEVICE, NONVOLATILE STORAGE SYSTEM, AND DATA WRITING METHOD

TECHNICAL FIELD

The present invention relates to a nonvolatile storage device, such as a semiconductor memory card including a flash memory as a main storage memory thereof, and a memory controller built therein. Furthermore, the present invention also includes a nonvolatile storage system adding an access device to the nonvolatile storage device as its constituent element, and a data writing method that describes operations of the memory controller.

BACKGROUND ART

Demands of the nonvolatile storage device including a nonvolatile main storage memory capable of rewriting widely spread mainly in the semiconductor memory card. Such semiconductor memory cards include various types, and as one of them, there is a SD memory card (registered trademark). This SD memory card includes a flash memory as a nonvolatile main storage memory, and has a memory controller for controlling it. The memory controller is configured to perform read-write control on the flash memory in response to read-write instructions from an access device such as a digital still camera, a body of a PC (personal computer).

Now consider a case where such the SD memory card is attached to the access device of the personal computer etc., and the personal computer assumes it as a removable disk, controls it with a FAT file system, and thereby accesses the data.

Originally, the FAT file system is a system whereby data reading and writing are instructed in units of clusters which are minimum write units of data using a file allocation table (FAT) when recording a file and data in a recording device.

Among recording devices, recording devices of a magnetic recording type, such as a hard disk or a flexible disk, are characterized in that a cluster size and an erase size are identical, realizing a mechanism which enables erasing and overwriting of data for every specified cluster. Because of this, the FAT file system is a file management system that is very convenient for the recording devices of the magnetic recording type.

On the other hand, in flash memories of a NAND type and of an AND type that constitute the SD memory card, conventionally the cluster size and the erase size (a size of a physical block) are identical, and, for example, 16 k bytes. Therefore, even when data in the SD memory card is managed by using the FAT file system, no problem takes place because it does not differ largely from the recording devices of the magnetic recording type.

In recent years, however, with a need for enlarging a capacity of the flash memory, a flash memory whose physical block size, i.e., the erase size is larger than or equal to 128 k bytes becomes the mainstream. As is well known, such large-capacity flash memory is a device characterized in that the erase size is larger than the cluster size (for example, 16 k bytes) and an overwriting in units of clusters is impossible.

Assume that data of one cluster is rewritten in the SD memory card composed of such large-capacity flash memory. Particularly, assumed is a case where "data needing to be rewritten" and "non-rewritten data not needing to be rewritten" exist in a one physical block of the SD memory card.

In this case, "data rewriting of only one cluster in the physical block" that is required by the FAT file system side cannot be done simply. Because of this, the SD memory card receiving a rewrite instruction temporarily saves the non-rewritten data in another physical block once, and then the new data is written in the other physical block in which the non-rewritten data has been saved.

Such a technique of rewrite processing is disclosed in, for example, Patent document 1.

The nonvolatile storage device disclosed in this document employs a method whereby, when a part in a physical block storing old data is rewritten with new data, the non-rewritten data is copied (saved) in another physical block from the physical block. Such a technique of rewriting will be referred to as a "rewriting technique on the premise of saving data" in the present specification.

An outline procedure of this "rewriting technique on the premise of saving data" is as follows. Usually, in the physical block on the flash memory, sectors are arranged in a logical order, namely sequentially from a lower address side (from a small address value) of the physical block so that logical sector numbers align 0, 1, . . . . Data writing by the rewriting technique on the premise of saving data is performed as follows:

(i) a step for receiving a logical address specified by an access device;

(ii) a step for converting the logical address into a physical address on the main storage memory;

(iii) a step for, when only a part of the data stored in the physical block is rewritten with new data, copying the old data that is not changed (non-rewritten data) in a already erased physical block that exists separately from the physical block;

(iv) a step for writing new data in the already erased physical block in which the old data was copied;

(v) a step for allocating the physical block in which the old data has been recorded to an unused physical block; and (vi) a step for erasing the contents of the old physical block.

As is clear from the above explanation, since the "rewriting technique on the premise of saving data" is such that unrewritten data is temporarily saved in another physical block although it is the rewriting of one cluster, subsequently new data is written in the physical block, and the physical block previously being used is erased, the technique is complicated and time-consuming processing.

As a technique whereby a counter measure is devised to such a problem, Patent document 2 discloses the technique, for example.

Flash memory that employs this technique is free from a restriction where a sector arrangement order in the physical block should be a logical order and is so configured that the data may be written in a received order of write commands from the lower order page of the physical block. Moreover, a recording state is controlled by indicating whether valid data is written in each page in which each sector is written or whether the data is invalid because of old data. Hereafter, this management technique will be referred to as an "additional writing type rewriting technique".

By the additional writing type rewriting, since no saving processing of the data takes place each time the access device issues a command of the data writing, writing itself is performed at a relatively high speed, however, a garbage correction is required at a certain timing. The garbage collection is processing where only valid sectors are selected from the predetermined block and are written in another block that is already erased, and the block that becomes invalid is erased.

Patent documents 1: Japanese Unexamined Patent Publication No. 2003-263894

Patent documents 2: Japanese Unexamined Patent Publication No. Hei 5-27924

DISCLOSURE OF THE INVENTION

Problems to be Solved by the Invention

Garbage collection processing in the additional writing type rewriting technique described above takes a relatively long time, and considering a time used for this, it is hard to say that an average performance of the additional writing type rewriting technique at a time of data writing is so high.

However, in a case where, like a large-capacity SD memory card, the nonvolatile storage device including the main storage memory whose erase size is larger than the cluster size is managed with the FAT file system, it is necessary to apply either the "rewriting technique on the premise of saving" or the "additional writing type rewriting technique", or a technique equivalent to them.

Then, in consideration of the above-mentioned problems, it is an object of the present invention to provide a memory controller, a nonvolatile storage device, a nonvolatile storage system, and a data writing method that can perform data rewriting at a higher speed on the premise of using a data rewriting technique of the "rewriting technique on the premise of saving", i.e., that negates the need of the garbage collection, by rationalizing the saving processing compared to the conventional technique.

Means to Solve the Problems

To solve the problems, a memory controller of the present invention for reading data from a nonvolatile main storage memory in which an erase size is larger than a cluster size and writing data given from the outside into the main storage memory, comprising: a first read-write control part for controlling reading and writing of data to said main storage memory; a nonvolatile auxiliary storage memory for temporarily storing data before being written in said main storage memory; and a second read-write control part for collectively reading a plurality of data temporarily stored in said auxiliary storage memory and writing them to said main storage memory through said first read-write control part.

To solve the problems, a nonvolatile storage device of the present invention which comprises: a nonvolatile main storage memory having a plurality of erase blocks whose size is larger than a cluster size; and a memory controller for reading data from said main storage memory and wring data given from the outside into said main storage memory, wherein said memory controller includes: a first read-write control part for controlling reading and writing of data to said main storage memory; a nonvolatile auxiliary storage memory for temporarily storing data before being written in said main storage memory; and a second read-write control part for collectively reading a plurality of data temporarily stored in said auxiliary storage memory and writes them in said main storage memory through said first read-write control part.

To solve the problems, a nonvolatile storage system of the present invention comprising: a nonvolatile main storage memory; a memory controller; and an access device, wherein said access device gives a logical address and data to said memory controller so as to access said main storage memory, and said memory controller reads data stored in the main storage memory and writes data into the main storage memory according to said given logical address, and wherein said main storage memory includes a plurality of erase blocks whose size is larger than a cluster size, said memory controller includes: a first read-write control part for controlling reading and writing of data to said main storage memory; a nonvolatile auxiliary storage memory for temporarily storing the data before being written in said main storage memory; and a second read-write control part for collectively reading a plurality of data temporarily stored in said auxiliary storage memory ad writes them in said main storage memory through said first read-write control part.

Here, said auxiliary storage memory may be capable of storing at least equal to or more than data of two clusters.

Here, said main storage memory may output a write completion signal indicating that data writing in said main storage memory is completed and a status signal indicating a state of the data writing in said main storage memory, and said second read-write control part may create a transfer success flag indicating that the data writing from the auxiliary storage memory to the main storage memory is successful based on said write completion signal and status signal and may write new data into said auxiliary storage memory based on the transfer success flag.

Here, said auxiliary storage memory may be a nonvolatile RAM.

Here, said auxiliary storage memory may be composed of any one of a ferroelectric memory (FeRAM), a magnetic random access memory (MRAM), an ovonic unified memory (OUM), and a resistance RAM (RRAM).

To solve the problems, a data write method of the present invention for writing data into a nonvolatile storage device including a nonvolatile main storage memory in which an erase size is larger than a cluster size and a nonvolatile auxiliary storage memory, comprising the steps of: temporarily storing said data in said auxiliary storage memory, and collectively taking out a plurality of data in said auxiliary storage memory and storing them in the main storage memory.

Here, said auxiliary storage memory may be capable of storing at least equal to or more than data of two clusters.

Here, the data write method may further comprise the steps of: creating a transfer success flag indicating that data writing from the auxiliary storage memory to the main storage memory is successful based on a write completion signal indicating that data writing to said main storage memory is completed and a status signal indicating a state of the data writing in said main storage memory; and writing new data into said auxiliary storage memory based on said transfer success flag.

EFFECTIVENESS OF THE INVENTION

According to the present invention, in writing data to the main storage memory given from the outside, it becomes possible to rationalize the saving processing and thereby perform the data writing at a high speed by temporarily storing the data in the auxiliary storage memory (buffering), collectively taking out a plurality of pieces of data in the auxiliary storage memory, and then storing them in the main storage memory. Moreover, since new data is written in the auxiliary storage memory based on a completion state of the data writing to the main storage memory etc., it is possible to write the data surely even when abnormalities take place, such as a writing error in the main storage memory and the power shutdown of the storage device.

BRIEF DESCRIPTION OF DRAWINGS

FIG. 2 is a diagram showing a format of a physical block in a main storage memory.

FIG. 5 is a diagram showing a configuration of a FAT file system.

REFERENCE NUMERALS

Figure 1:
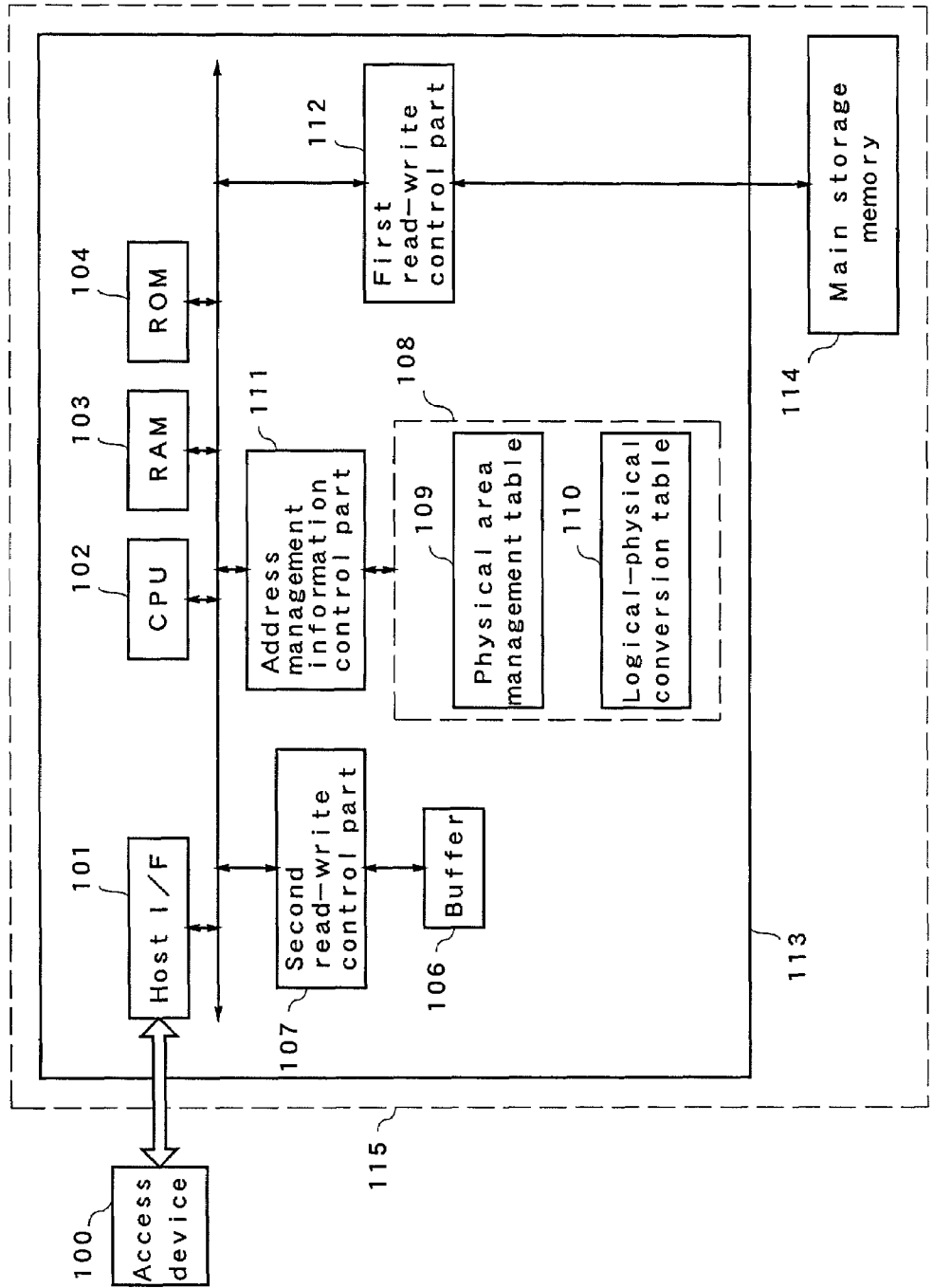
FIG. 1 is a block diagram of a nonvolatile storage system according to a first embodiment of the present invention.

100 Access device
106 Buffer (nonvolatile auxiliary storage memory)
107 Second read-write control part (a first embodiment)
108 Access data storage memory
109 Physical area management table
110 Logical-physical conversion table
111 Address management information control part
112 First read-write control part (the first embodiment)
113 Memory controller
114 Main storage memory
115 Nonvolatile storage device
1600 First read-write control part (a second embodiment)
1601 Second read-write control part (the second embodiment)

BEST MODE FOR CARRYING OUT THE INVENTION

Hereafter, a first embodiment of a nonvolatile storage system according to the present invention will be explained. FIG. 1 is a block diagram of the nonvolatile storage system. The nonvolatile storage system includes a nonvolatile storage device and an access device 100 to which the nonvolatile storage device is connected.

A nonvolatile storage device 115 has a memory controller 113 and nonvolatile main storage memory 114 composed of a flash memory, and is capable of accessing the access device 100 provided outside.

The access device 100 performs transmission of read and write commands for user data (hereinafter simply referred to as data) and a logical address at which the data is stored and transmission and reception of the data, for the main storage memory 114 through the memory controller 113. In response to the read and write commands from this access device 100, the memory controller 113 writes the received data into the main storage memory 114, and reads the data from the main storage memory 114 and outputs the data to the outside.

In a case of the present embodiment, it is assumed that the access device 100 is a personal computer in which a FAT file system is active, an SD card memory which is a nonvolatile storage device 115 is inserted into this personal computer, and the personal computer is ready for recording data.

The nonvolatile storage device 115 under this situation is recognized as a removable disk form the connected personal computer side, and is so configured that the data written therein is controlled by the FAT file system. The FAT file system is a technique for writing the data using a file allocation table (FAT) when recording a file and data in a recording device and is a system widely used as it is now. Its smallest access unit is a cluster.

The main storage memory 114 is composed of the flash memory, substantially consisting of a large number of physical blocks (erase block) each of which is an erase unit. The size of the physical block is larger than the size of the cluster that is the smallest write unit.

Details of the nonvolatile storage device 115 will be explained below.

The memory controller 113 provided in the nonvolatile storage device 115 includes a host I/F 101 and a CPU 102 for controlling the whole memory controller 113. Moreover, it has a RAM 103 which is a working area of the CPU 102 and a ROM 104 storing a program executed by the CPU 102.

In addition, the memory controller 113 has an access data storage memory 108 for storing access data which is used when accessing the main storage memory 114 and an address management information control part 111 for reading and writing the access data from and in this access data storage memory 108.

A first read-write control part 112 writes data in the main storage memory 114, and reads data stored in the main storage memory 114 based on the address data read by the address management information control part 111.

In the case of the present embodiment, the access data storage memory 108 is composed of SRAM, and the access data stored in it substantially consists of a "physical area management table 109" and a "logical-physical conversion table 110". The physical area management table 109 stores states of the physical blocks each being an erase unit in the main storage memory 114, i.e., status flags each indicating whether valid data is stored. The logical-physical conversion table 110 converts the logical address transferred by the access device 100 to a physical address in the main storage memory 114.

In addition, the memory controller 113 has a nonvolatile auxiliary storage memory 106 (hereinafter referred to as a buffer) composed of FeRAM and the second read-write control part 107 for writing data stored in the buffer 106.

FIG. 2 shows a format of a plurality of physical blocks provided in the main storage memory 114. As shown in this figure, the physical block consists of 64 pages from PP0 to PP63, and each page substantially consists of a data area of four sectors and a management area of 64 bytes. In the present embodiment, one sector is 512 bytes and the data area of one page is 2048 bytes. One cluster is composed of eight pages. In FIG. 2, physical allocation symbols are given to an arrangement as PSA0, PSA1, . . . , and PSA255 from the upper left. Here, the PSA is an abbreviation formed from initials of Physical Sector Address.

Figure 3:
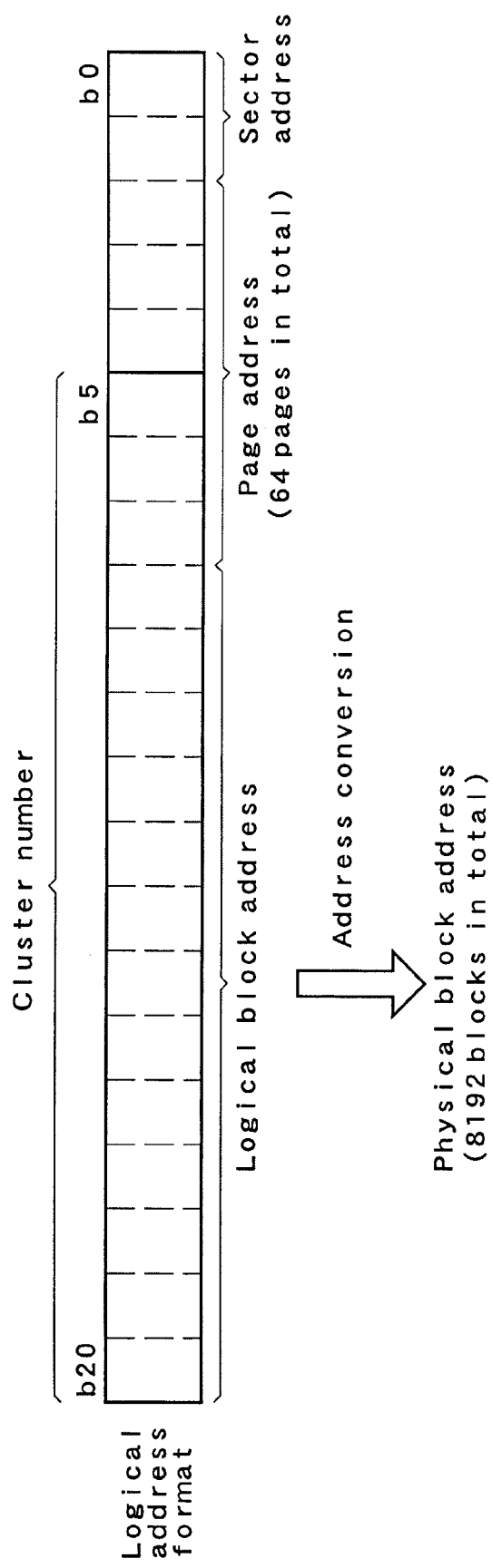
FIG. 3 is a diagram showing a format of a logical address.

FIG. 3 is a diagram showing a format of the logical address in the present embodiment. As shown in this figure, a sector address, a page address, and a logical block address are arranged sequentially from a lower order bit. 13 bits corresponding to the logical block address are an object of address conversion, i.e., an address of the logical-physical conversion table 110. Since the file system of the access device 100 specifies the sector size as 512 bytes and the cluster size as 16 k bytes, LSB of the cluster number corresponds to the bit 5 (b5) of the logical address format.

Figure 4A:
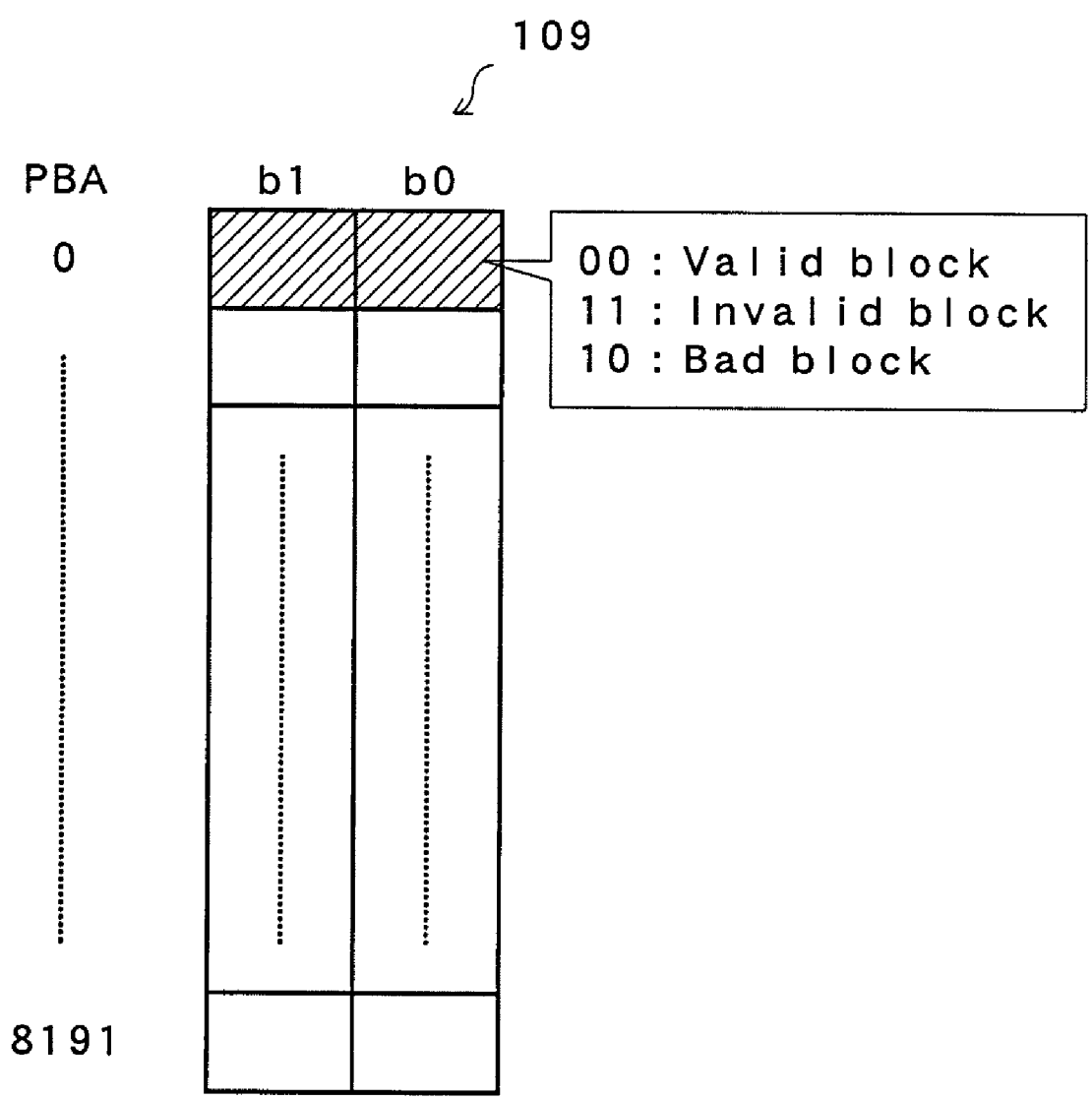
FIG. 4A is a diagram showing a physical management area table.

FIG. 4A shows a format of the physical area management table 109. As shown in this figure, addresses on the physical area management table 109 correspond to physical block addresses PBA in the main storage memory 114 and the table stores states of the physical blocks, respectively, as contents of the table. That is, a value of 00 in the binary notation indicates a valid block, which stores valid data, a value of 11 indicates an invalid block, which is already erased or retains written data but it is unnecessary, and a value of 10 indicates a bad block which has become unusable due to a solid error on a memory cell.

Figure 4B:
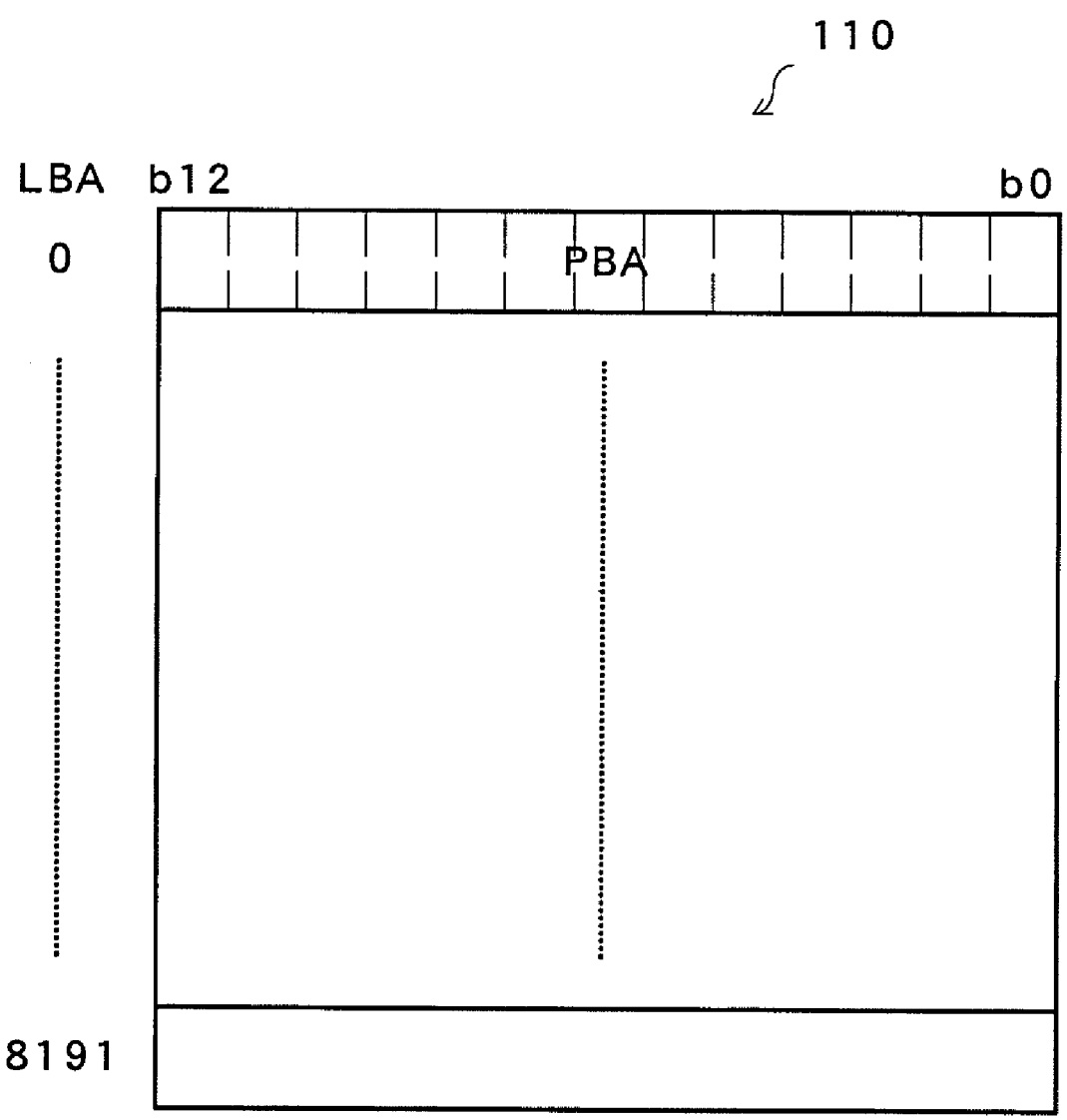
FIG. 4B is a diagram showing a logical-physical conversion table.

FIG. 4B shows a format of the logical-physical conversion table 110. In this table 110, the physical block addresses PBA in the main storage memory 114 are arranged so as to correspond to respective logical block addresses LBA.

Figure 13:
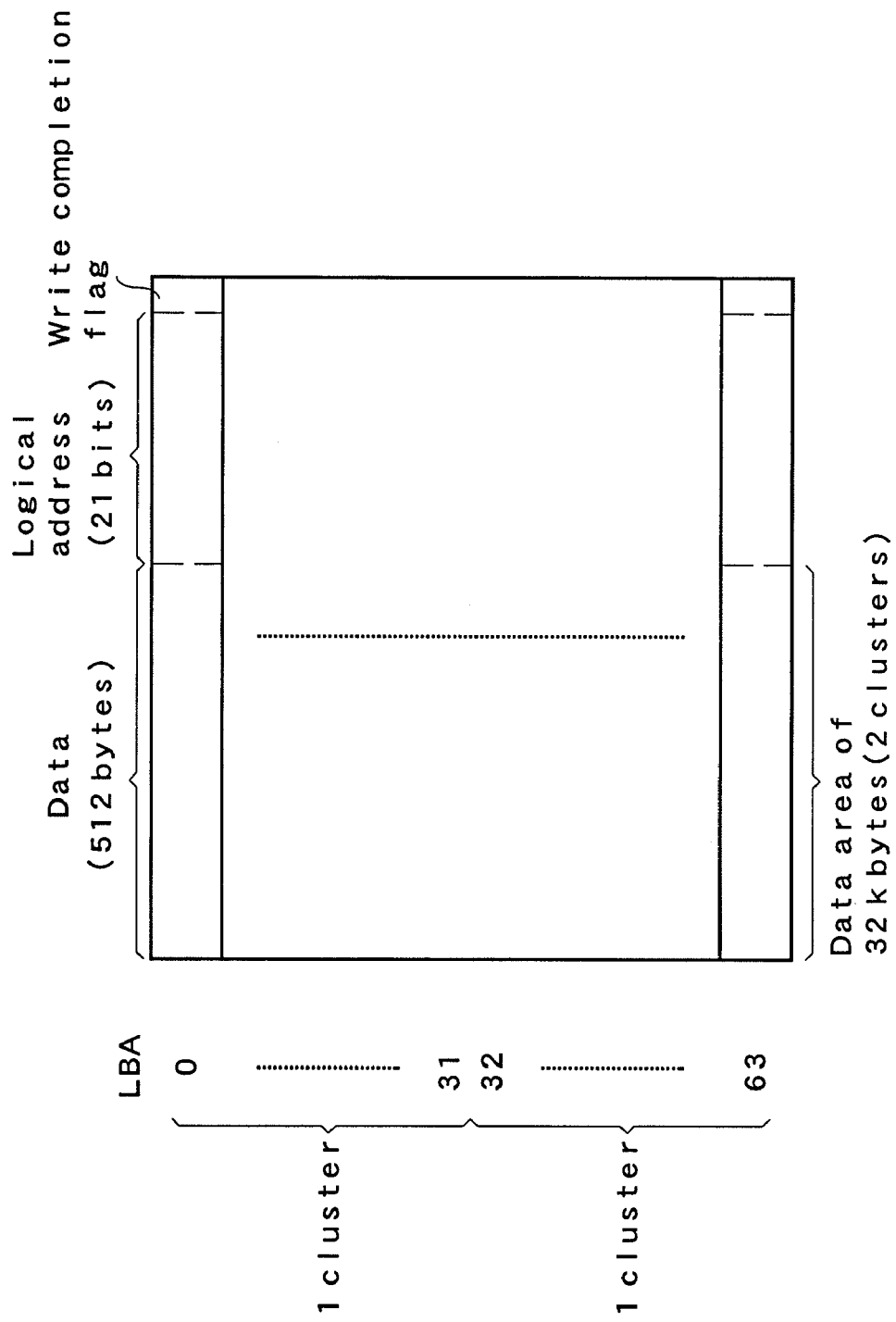
FIG. 13 is a diagram showing a data format in a buffer.

In the case of the present embodiment, the buffer 106 is configured so that it can store data of two clusters. To be specific, as shown in FIG. 13, the buffer 106 of the present embodiment substantially consists of a data area, a logical address area, and a write completion flag. The data area has a size of 32 k bytes=16 k bytes (1 cluster data)×2, and is divided into sectors (each 512 bytes) each of which is a minimum write unit of the access device 100. Moreover, the logical address (21 bits) and the write completion flag are allocated to every sector.

Before explaining operations of the nonvolatile storage system described above, the FAT file system for managing the data in the main storage memory 114 will be described.

[FAT File System]

FIG. 5 shows a configuration of the FAT file system. The FAT file system is already used in a universal OS and is widely known. The FAT file system has a configuration such that a file system management area is included in a storage device 500 (in the present embodiment, the main storage memory 114), a management information area 501 exists in the head of this file system management area, and subsequently a data area 502 for storing data exists.

The management information area 501 substantially consists of a master boot record partition table (MBR-PT) 503, a partition boot sector (PBS) 504, a FAT 505, a FAT 506, and a root directory entry (RDE) 507.

The master boot record partition table 503 is an area for storing information for managing the file system management area by dividing the area into a plurality of partitions. The partition boot sector 504 is an area for storing management information in one partition. The FAT 505 and the FAT 506 are areas for showing physical storage positions of data contained in files, respectively. Since these FATs are important areas that describe physical storage positions of data contained in the files, usually there are two areas, FAT1 (FAT505) and FAT2 (FAT 506), that have the identical information in the file system management areas, thereby being duplicated. The root directory entry 507 is an area for storing a file existing immediately below the root directory and information of the directory.

The data area 502 is managed being divided into a plurality of clusters, each cluster stores data contained in the file. Files storing large data etc. store the data striding over a plurality of clusters, and a connection of the respective clusters is managed by link information stored in the FAT 505 and the FAT 506.

A data storing method in the FAT file system will be explained.

Figure 6:
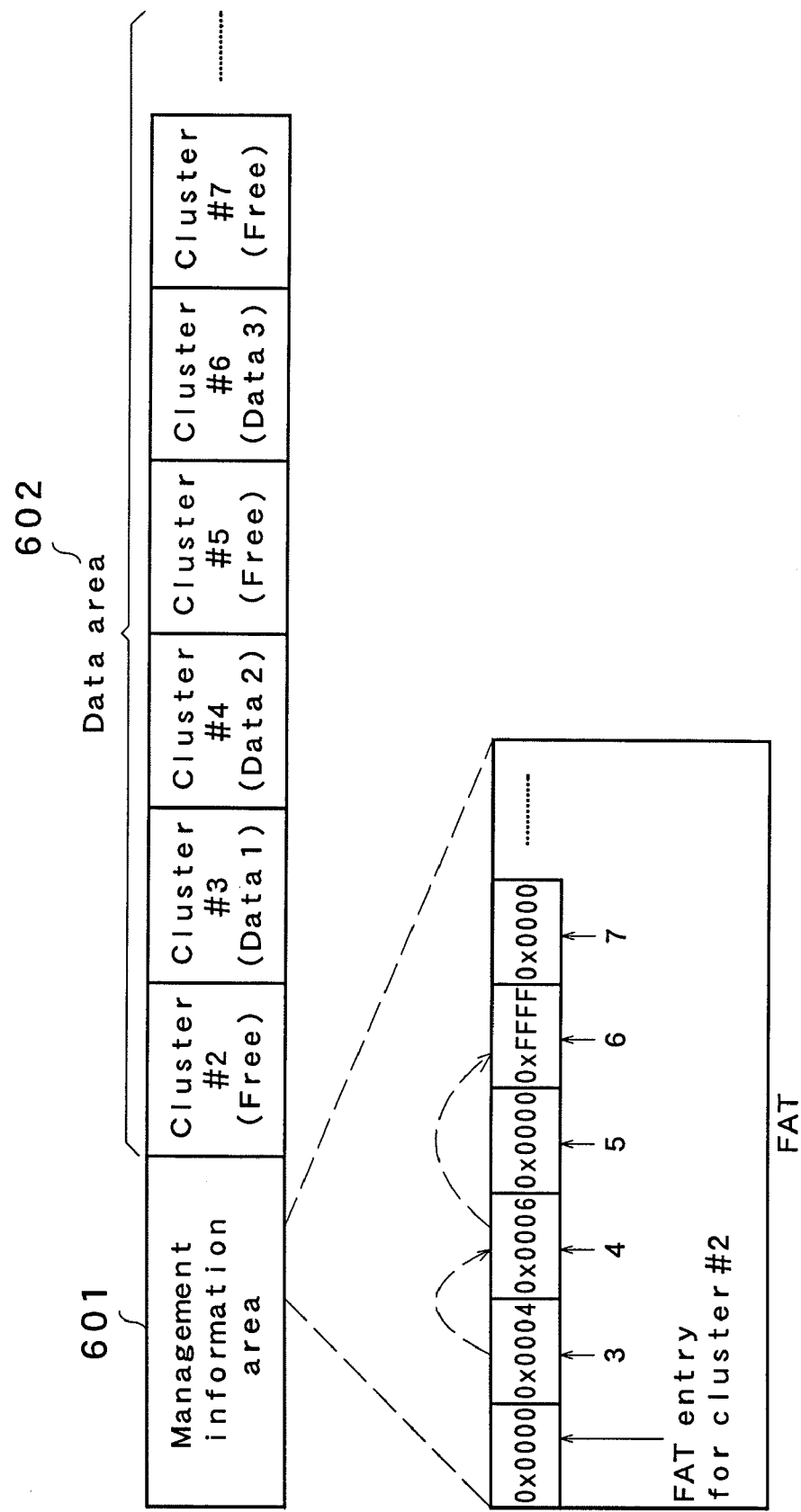
FIG. 6 is a diagram showing a data storing situation in the FAT file system.

FIG. 6 is an explanatory diagram showing an example of data storing in the FAT file system. As shown in this figure, the data area 602 (corresponding to the reference numeral 502 of FIG. 5) is managed in units of fixed-length blocks called a cluster, and a cluster number is given to each cluster in an ascending order which starts from #2.

The FAT 505 and FAT 506 manage a situation of use of each cluster and link information showing the connection between the clusters, substantially consisting of FAT entries corresponding to each cluster number.

Depending on a type of the FAT file system, the FAT entry takes one of three sizes per cluster, 12 bits, 16 bits, and 32 bits. An example of FIG. 6 shows a case where one entry is expressed with 16 bits.

The FAT entry stores any one of the following: a cluster number of a next connecting cluster; 0x0000 indicating that the cluster is a free area; and 0xFFFF indicating that the cluster is an end of the link. In the example of FIG. 6, the FAT entries corresponding to the cluster numbers #2, #5, and #7 each store 0x0000, indicating that these three clusters are free areas. Moreover, a FAT entry corresponding to the cluster number #3 stores 0x0004, a FAT entry corresponding to the cluster number #4 stores 0x0006, and a FAT entry corresponding to the cluster number #6 stores 0xFFFF, indicating that the data is divided and stored into three clusters, cluster numbers #3, #4, and #6.

Next, an example of file data writing in the FAT file system will be explained using FIG. 7 to FIG. 9.

Figure 7:
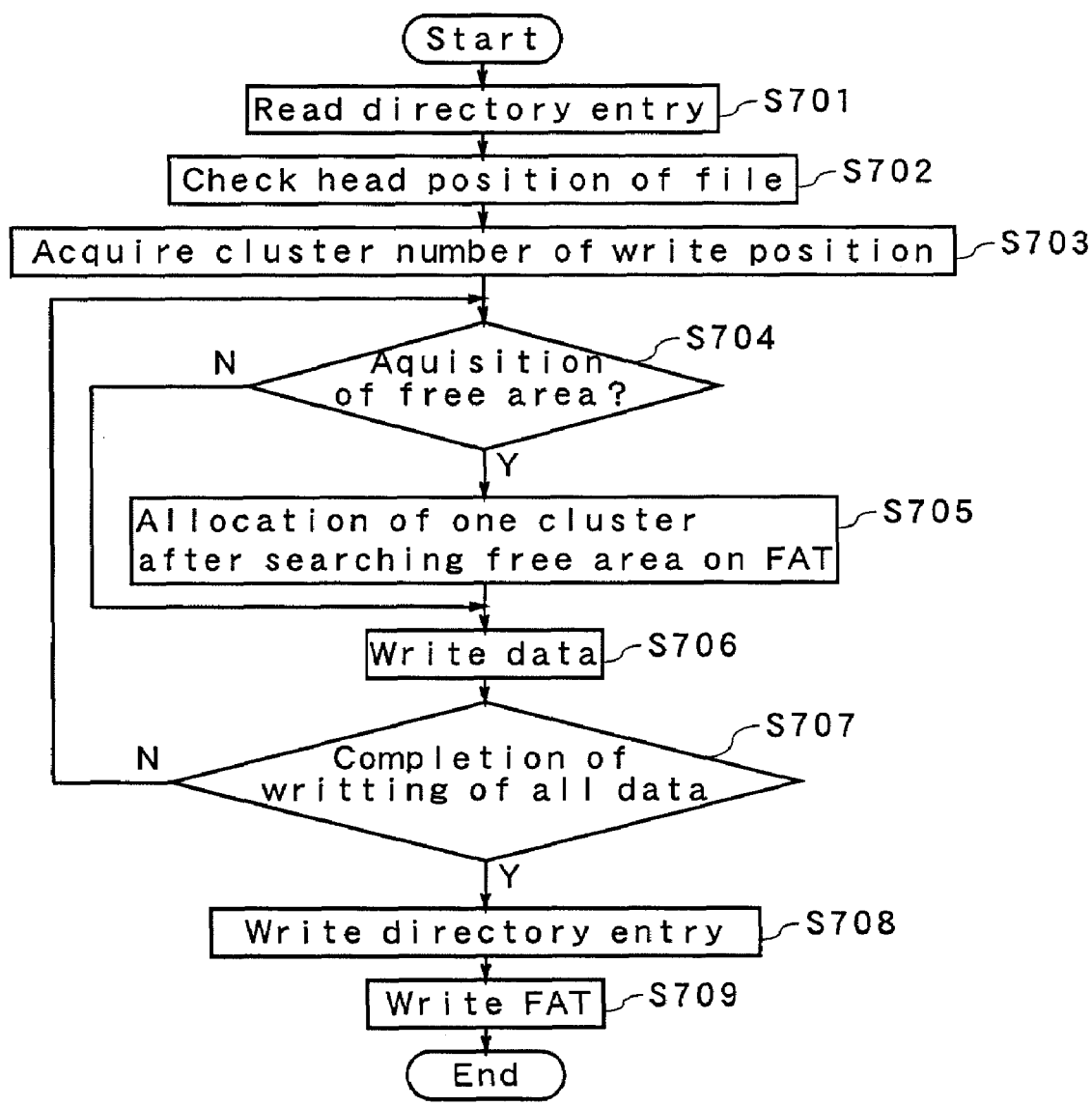
FIG. 7 is a flowchart showing a procedure of data writing in the FAT file system.

FIG. 7 shows a procedure of the file data writing in the FAT file system.

Figure 8:
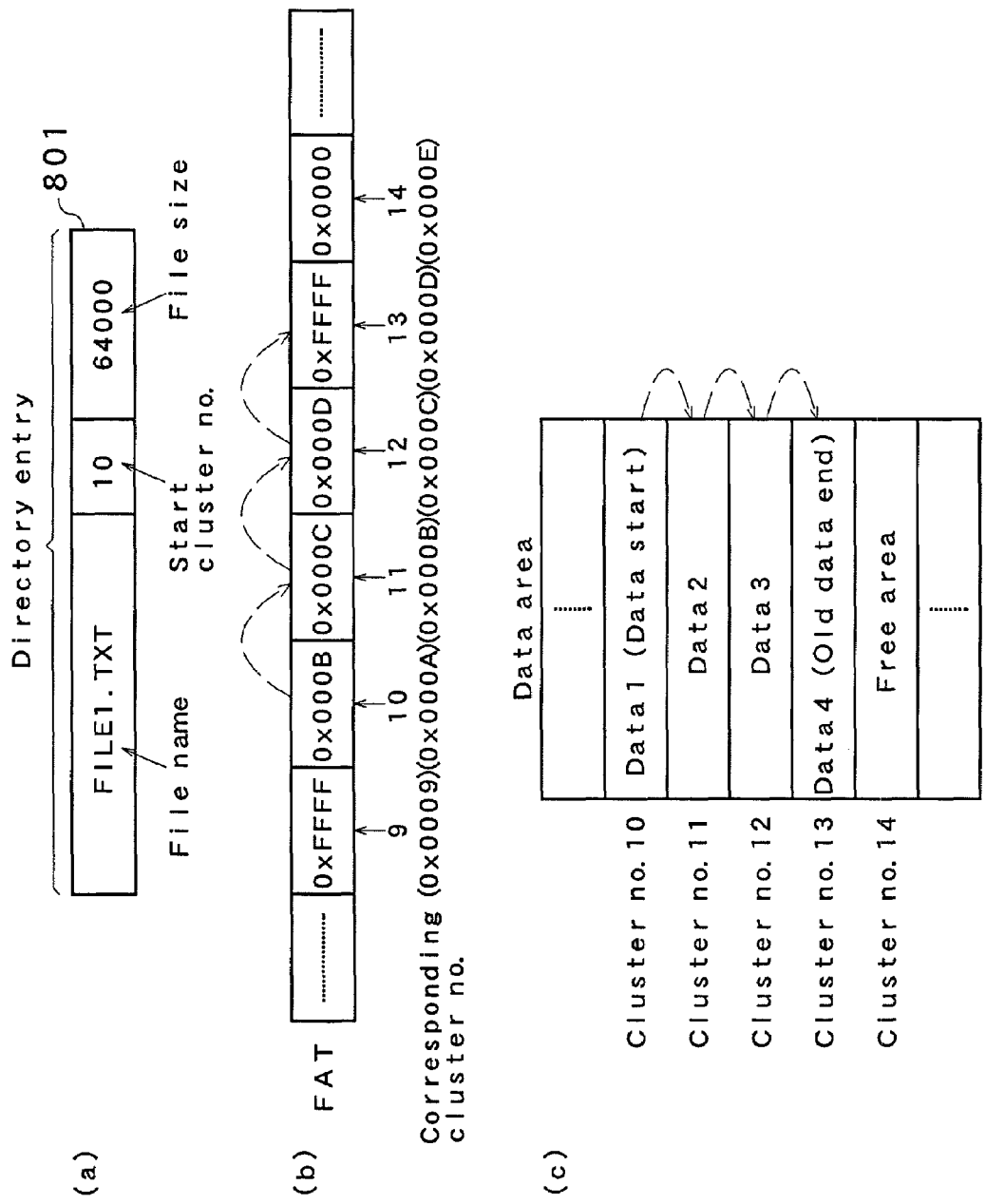
FIG. 8(a) is a diagram showing a directory entry before write processing.
FIG. 8(b) is a diagram showing the FAT before the write processing.
FIG. 8(c) is a diagram showing the data area before the write processing.
Figure 9:
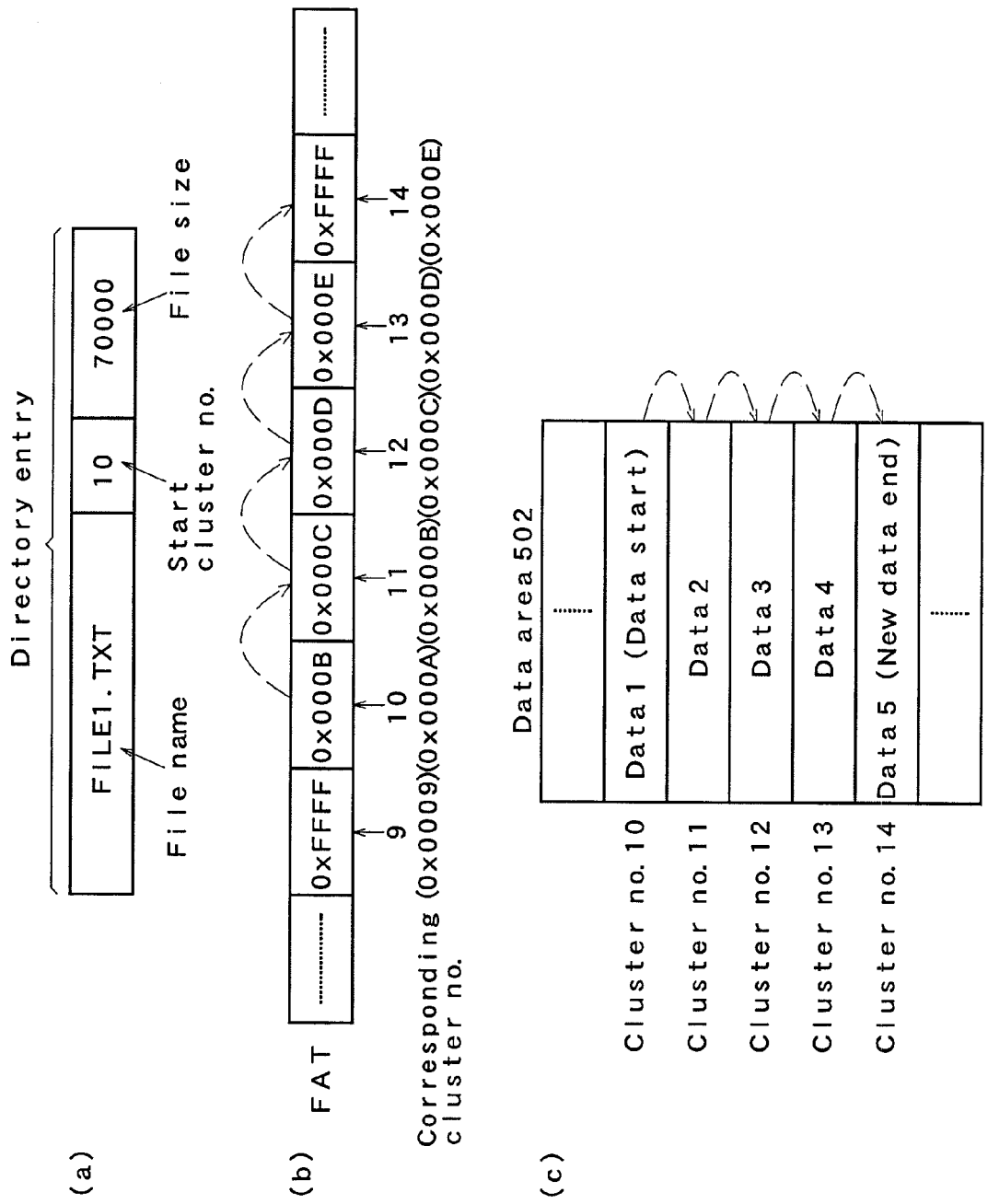
FIG. 9(a) is a diagram showing the directory entry after the write processing.
FIG. 9(b) is a diagram showing the FAT after the write processing.
FIG. 9(c) is a diagram showing the data area after the write processing

FIG. 8 and FIG. 9 are diagrams showing an example of the directory entry 801, the FAT 505, the FAT 506, and the data area 502, before write processing and after the write processing, respectively.

In the FAT file system, a part of the root directory entry 507 and the data area 502 stores the directory entry 801 storing information of a file name, a file size, and a file attribute, etc. FIG. 8(a) shows one example of the directory entry 801.

A file shown by this directory entry 801 has a file name of FILE1.TXT, which stores file data starting from a cluster number 10. Since the file size is 64 k bytes and the size of one cluster is 16 k bytes, the file stores the file data striding over four clusters.

The file data write processing will be explained using FIG. 7. In the file data write processing, first the directory entry 801 of an object file is read (S701).

Next, a start cluster number stored in the read directory entry 801 is acquired and a head position of the file data is confirmed (S702).

Thereafter, the FAT 505 and the FAT 506 are read, a link is followed on the FAT 505 and the FAT 506 sequentially starting from the head position of the file data acquired in S702, and a cluster number of a write position is acquired (S703).

Next, it is determined in writing the data whether it is necessary to newly allocate a free area for the file (S704). If the allocation of the free area is unnecessary, the flow proceeds to processing in S706.

If the allocation of the free area is necessary, a free area is searched for on the FAT 505 and the FAT 506, and the free area of one cluster is allocated in the end of the file (S705).

Then the data is written in the cluster currently referred to (S706).

Thereafter, it is determined whether writing of the whole file data has been completed (S707). If the data still remains, the flow returns to the processing of S704. If the writing of the file data is completed, a file size, a time stamp, etc. stored in the directory entry 801 are updated and written in the storage device 500 (S708).

Finally, the FAT 505 and the FAT 506 are written in the storage device 500, and the processing is completed (S709).

When 6 k bytes data is further written in FILE1.TXT having 64 k bytes data shown in FIG. 8 by this file data write processing, it will change to a file with 70 k bytes data shown in FIG. 9. In this way, in the FAT file system, an area allocation is performed in units of clusters as storage areas of the file data, and the data is stored.

In addition, also in a case of data reading, substantially similar to the data writing, the read processing is performed referring to the FAT chain.

First, the directory entry 801 of the object file is read. Next, the start cluster number stored in the read directory entry 801 is acquired, and the head position of the file data is confirmed. Then, a link is followed on the FAT 505 and the FAT 506 sequentially from the head position of the acquired file data, and a cluster number is acquired. Based on this cluster number, the data of each cluster in the data area 502 is read sequentially.

When the access device 100 issues an access command based on the FAT file system described above, the nonvolatile storage device 115 will operate as follows.

[Initial State]

First, contents of the nonvolatile main storage memory 114 and the logical-physical conversion table 110 immediately after shipment will be explained. For simplicity, explanation of a system area of a maker code, and security information, etc. stored in the main storage memory 114 is omitted, and only a usual area, namely, an area from and in which the user reads and writes data will be explained.

All good blocks of the nonvolatile main storage memory 114 immediately after shipment are in an erased state, and, in a redundant area of the top page (hatched portion) of the physical block shown in FIG. 2, a status flag and a logical block address are set up. Since this status flag is in an initial state, it retains a value of 11 (invalid block) or value of 10 (bad block).

For the logical block address, the value of 1FFF in hexadecimal is set up. Meanwhile, a value of 1FFF means that the physical address in the main storage memory 114 is not the address 1FFF and that no physical address is set up at all. Therefore, the physical block in the main storage memory 114 with a physical address of the address 1FFF is an unusable physical block, and it is assumed that logical addresses managed by the access device 100 specify a space smaller than 8192 addresses from the address 0000 to the address 1FFF in units of 128 k bytes, a physical block size.

In addition, the buffer 106 secures areas for recording data of two clusters and a logical address for each sector which constitutes the respective data. A value of 0 is set to all the areas.

The physical area management table 109 and the logical-physical conversion table 110 in the access data storage memory 108 are created in boot processing described below after the power supply is turned on.

[Start Processing after the Power Supply is Turned On]

Next, the start processing after the power supply is turned on will be explained.

First, the access device 100 constructs a logical address space by formatting the main storage memory 114 based on the FAT file system.

Figure 10:
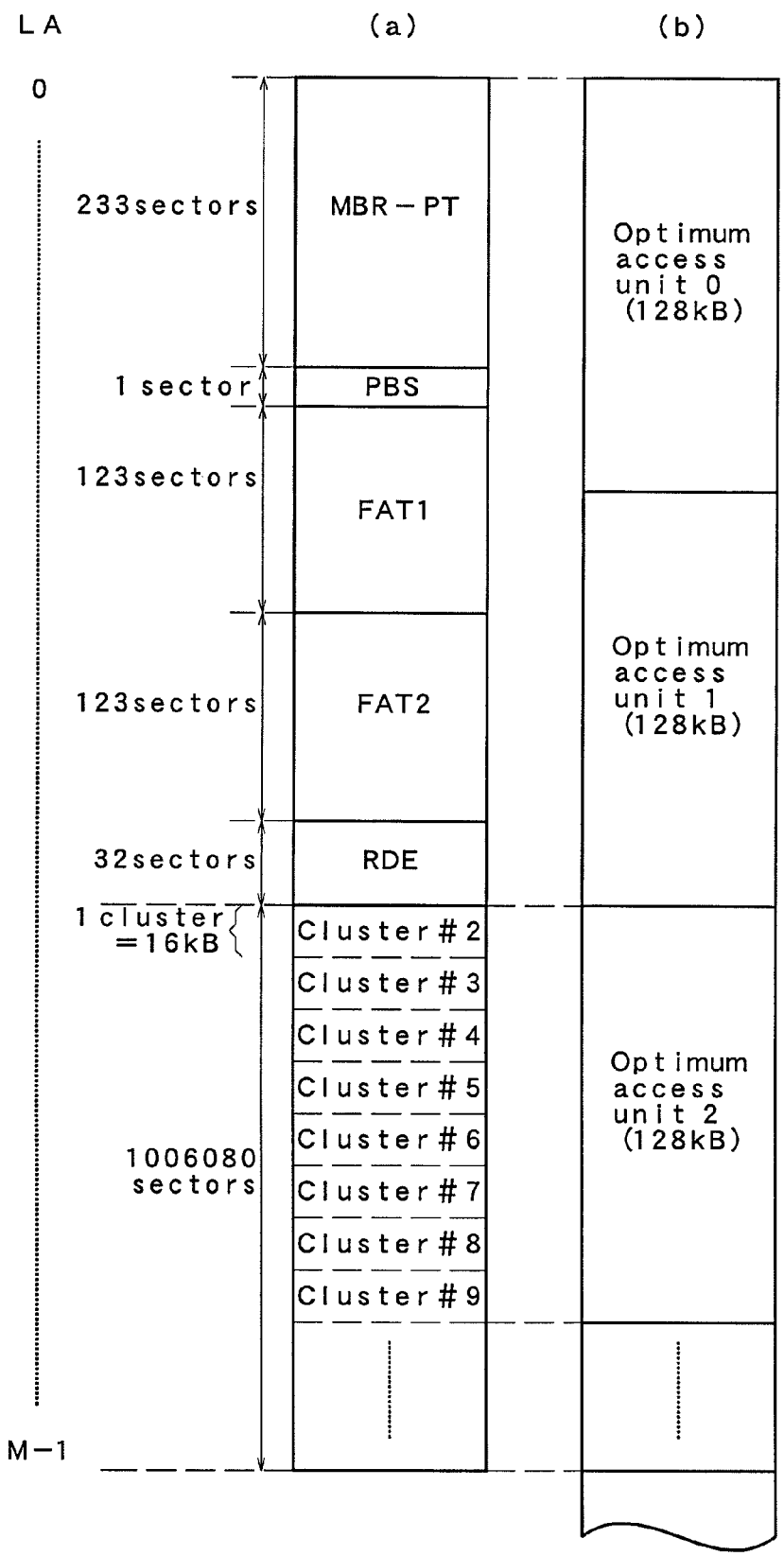
FIG. 10 is a diagram showing a correspondence relation between a logical address arrangement and the physical block.

FIG. 10 shows a logical address arrangement in the FAT file system and the physical blocks corresponding thereto.

FIG. 10 shows an arrangement diagram of a logical address in (a), and a physical block (b) in the main storage memory 114 corresponding to the logical address space formed by the FAT file system. MBR-PT is a master boot record partition table 503. PBS is a partition boot sector 504 and RDE is a root directory entry 507. In the present embodiment, a size of a management information area 501 from the master boot record partition table 503 to the root directory entry 507 is so adjusted that it may have a length of an integral multiple of the cluster size.

As shown from FIG. 10, a boundary of the data area 502 shown in FIG. 5, i.e., the area, which begins from the cluster #2, agrees with a boundary of the physical blocks.

Immediately after the formatting by the FAT file system, or after the power supply is turned on in the already formatted main storage memory 114, the CPU 102 executes initialization processing based on a program stored in the ROM 104.

In this initialization processing, firstly, the address management information control part 111 reads redundant areas in head pages in all the physical blocks in the main storage memory 114 through the first read-write control part 112. Then, the address management information control part 111 creates the physical area management table 109 and the logical-physical conversion table 110 on the access data storage memory 108.

After completion of the initialization processing, the memory controller 113 becomes ready to receive a read-write command etc. from the access device 100.

[Processing at Normal Operation]

Next, processing at the time of normal operations after the initialization will be explained.

In order to clarify a difference between the present invention and a conventional example, first, a conventional configuration where the buffer 106 does not exist in the nonvolatile storage device 115 is considered, and data writing in the storage will be described. Explanation of directory entry, the FAT 1, and the FAT 2 is omitted, and only the writing of only file data will be described.

Figure 11:
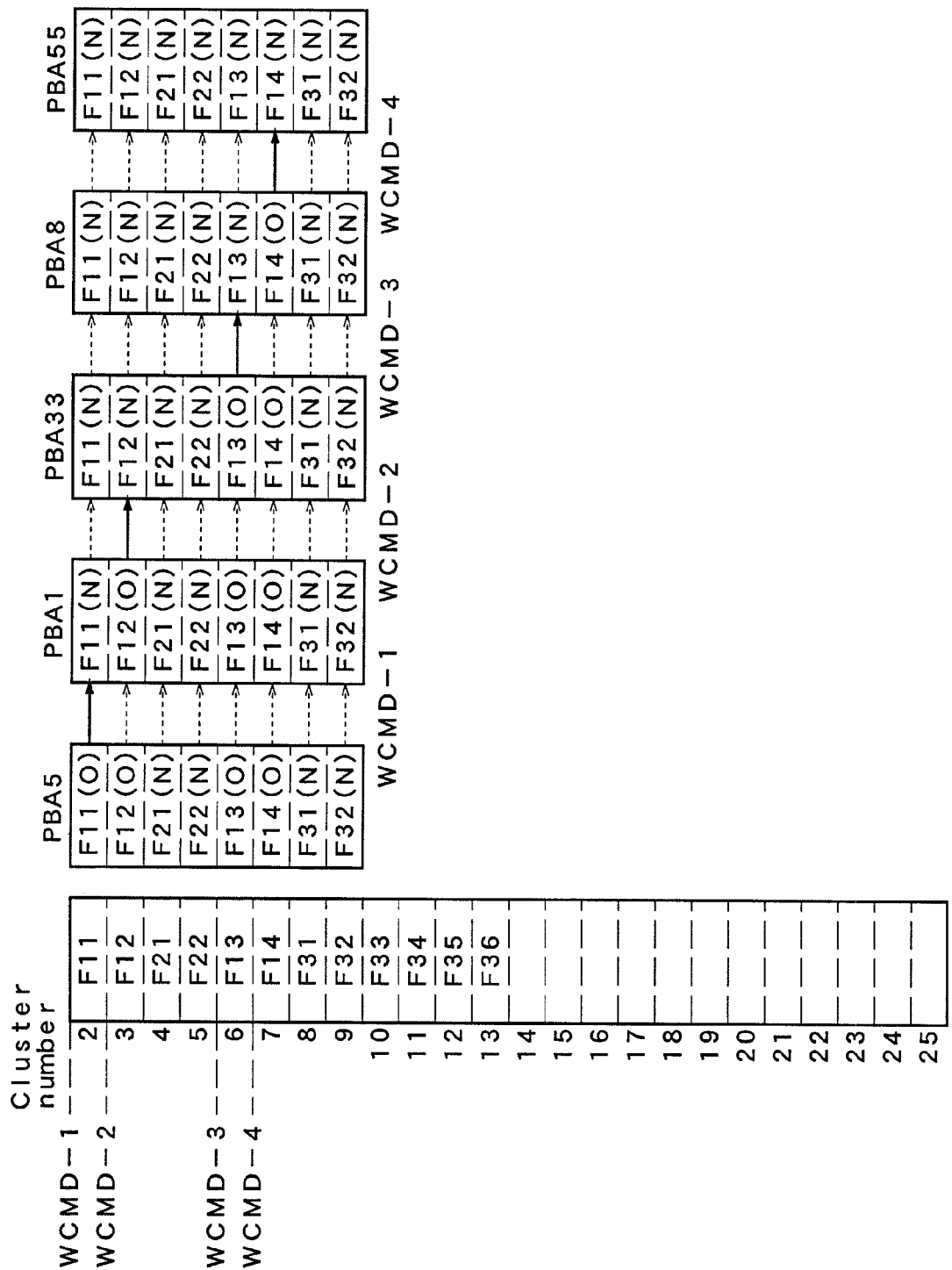
FIG. 11 is a diagram showing a situation where cluster data is written in the physical block in the main storage memory based on the FAT file system (conventional example).

FIG. 11 shows details of the data writing, that is, showing how the file data F1 composed of four clusters of F11, F12, F13, and F14 transferred by the access device 100 is written based on the FAT chain by allocating the file data to four write commands (WCMDs).

First, the access device 100 issues a first write command WCMD-1 to write the data F11 in the cluster number #2, and issues a next write command WCMD-2 to write the data F12 in the cluster number #3. Similarly, the access device 100 writes the data F13 in the cluster number #6 in a write command WCMD-3, and writes the data F14 in the cluster number #7 in a write command WCMD-4.

In addition, other data (file data F2) has been written in the cluster numbers #4 and #5, and other data (file data F3) has been also written in the cluster numbers #8 to #13. Moreover, it is assumed that old file data (F11(O), F12(O), F13(O), and F14(O)) corresponding to the file data F1 (F11(N), F12(N), F13(N), and F14(N)) has already been written in the nonvolatile main storage memory 114. Meanwhile, N denotes new data and O denotes old data. That is, "rewrite processing" will be executed in the management of the memory controller side 113.

Details of the data rewrite processing are as follows.

At a present time, it is assumed that the physical block corresponding to cluster numbers #2 to #9 in the logical address space is PBA 5. Assume that each PBA is divided into eight clusters each having 16 k bytes. In first and second areas on an upper address side of the PBA5, the F11 and F12 are written respectively. In a third and fourth areas from a lower address side thereof, F21 and F22 are written respectively.

First, the access device 100 issues the write command WCMD-1, and the memory controller 113 receives the WCMD-1, a logical address corresponding to the WCMD-1, i.e., cluster number #2, and the data F11. A cluster number corresponds to a cluster number of the logical address format shown in FIG. 3.

Based on this logical address value, the address management information control part 111 searches for an invalid block in a descending order starting from a predetermined address of the physical area management table 109, and designates the first found invalid block, for example, PBA1 as a block to be written. After erasing the PBA1, the data F11 is written. The above-mentioned predetermined address is an address that the CPU 402 sequentially sets up in the address management information control part 111, and is processed so as to become random at each time of the setting. Therefore, it becomes possible to realize a wear leveling by which blocks to be written are not focused on a specific block.

Next, by referring to the physical area management table 109, it is found that valid information is written in a physical block address (PBA5) corresponding to the cluster numbers #2 to #9. Similarly, in the physical area management table 109, a status flag corresponding to the physical block address is in a valid state. Therefore, with the writing of the F11 that is one cluster data of new data F1, save processing (copy processing) for saving PBA5 containing the F12, F21, F22, F13, F14, F31, and F32 in the PBA1 becomes necessary.

In FIG. 11, a solid line arrow shows the write processing to flash memory, and a dashed line arrow shows the save processing (copy processing). The F12, F21, F22, F13, F14, F31, and F32 read from the PBA 5 are saved in the PBA1.

The processing described above will be repeated also in processing of the write commands WCMD-2 to WCMD-4.

That is, in the write command WCMD-2, the F12 in physical block PBA33 is rewritten and the saving processing is executed to other cluster data.

In the write command WCMD-3, the F21 in physical block PBA8 is rewritten and the saving processing is executed to other cluster data.

In the write command WCMD-4, the F22 in physical block PBA55 is written and the saving processing is executed to other cluster data. Therefore, finally the new file data F1 is written in the PBA55.

The above description showed writing processing in a case where there does not exist the buffer 106 which is realized with a nonvolatile RAM. As shown in FIG. 11, four times of the writing processing in units of clusters shown by the "solid line arrows" and 28 times of the saving processing shown by the dashed line arrows are necessary.

On the other hand, the embodiment of the present invention wherein the memory controller 113 has the buffer 106 will be explained using FIG. 12 to FIG. 15. In the present embodiment, it is so configured that a plurality of cluster data is collectively transferred to the physical block in the main storage memory 114.

In the following explanation, it is assumed that the buffer 106 does not store valid data at all. Since the buffer 106 is realized with FeRAM, i.e., a memory device which allows data to be overwritten, erase processing prior to the writing is unnecessary.

Figure 12:
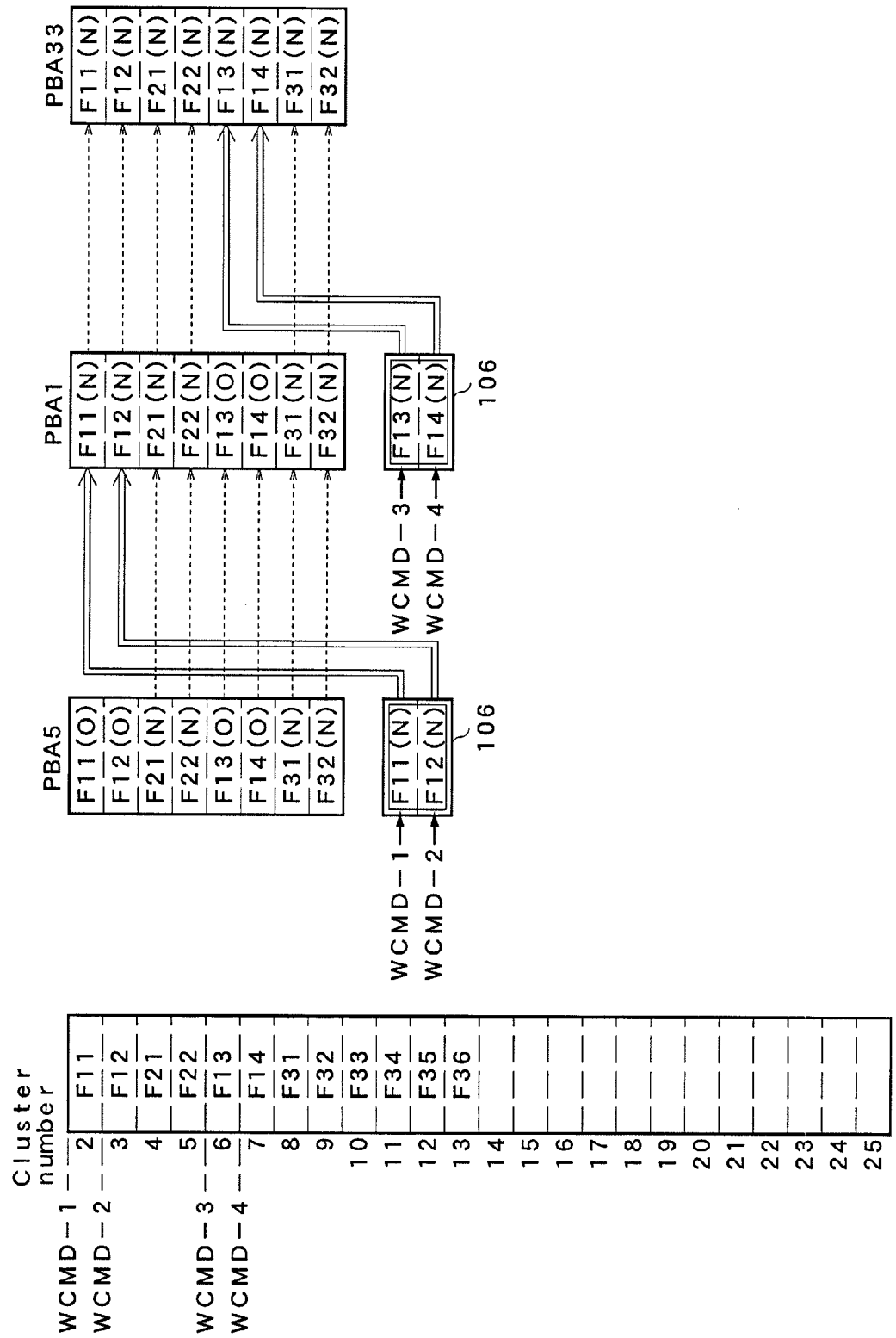
FIG. 12 is a diagram showing a situation where the cluster data is written in the physical block in the main storage memory based on the FAT file system in embodiment 1 and embodiment 2.

In FIG. 12, the access device 100 issues the first write command WCMD-1 to write the data F11 in the buffer 106, and issues the next write command WCMD-2 to write the data F12 in the buffer 106. Solid line arrows show the write processing to the buffer 106. Since the write completion flag in the buffer 106 is set to a value of 1 when the data is written therein, it is so configured that a writing destination address to the buffer 106 is continuously written from the lower address side whose write completion flag is a value of 0.

Since the buffer 106 becomes full at the time when writing of the data of the F 11 and the F12, i.e., data of two clusters, is completed, the second read-write control part 107 reads collectively two data of the F11 and F12 from the buffer 106, and transfers them to the physical block PBA1 in the main storage memory 114 through the first read-write control part 112. Double-lined arrows show this read and the write processing to the main storage memory. Along with this transfer, valid data stored in the PBA 5, i.e., the F21, the F22 and the F13, the F14 and the F31, and F32, are saved in the PBA1 as shown by dashed line arrows.

At the time when all the transfer is completed, the buffer 106 becomes ready to receive data from the access device 100. Alternatively, it does not cause any problem in making the buffer 106 ready for reception at the time of completion of transfer of the predetermined data in the buffer 106, for example, data of one cluster or 512 byte data.

After the buffer 106 has become ready for reception, the access device 100 issues the write command WCMD-3 to write the data F13 in the buffer 106, and issues the next write command WCMD-4 to write the data F14 in the buffer 106.

Since at the time of completion of writing of the F13 and F14, the buffer 106 becomes full again, the two clusters data of the F13 and the F14 from the buffer 106 are collectively transferred to the physical block PBA33 in the nonvolatile main storage memory 114. Along with this transfer, the valid data stored in the PBA1, i.e., the F11, the F12 and the F21, the F22 and the F31, and the F32 are saved in the PBA33.

As can be understood from the above description, in the nonvolatile storage device of the present embodiment, since the number of times of writing in units of clusters shown by the double-lined arrow is four and saving processing shown by the dashed line arrows is 12 times. Therefore, comparing with a conventional technique, the number of times of the saving processing becomes approximately one half that of the conventional technique.

Figure 14:
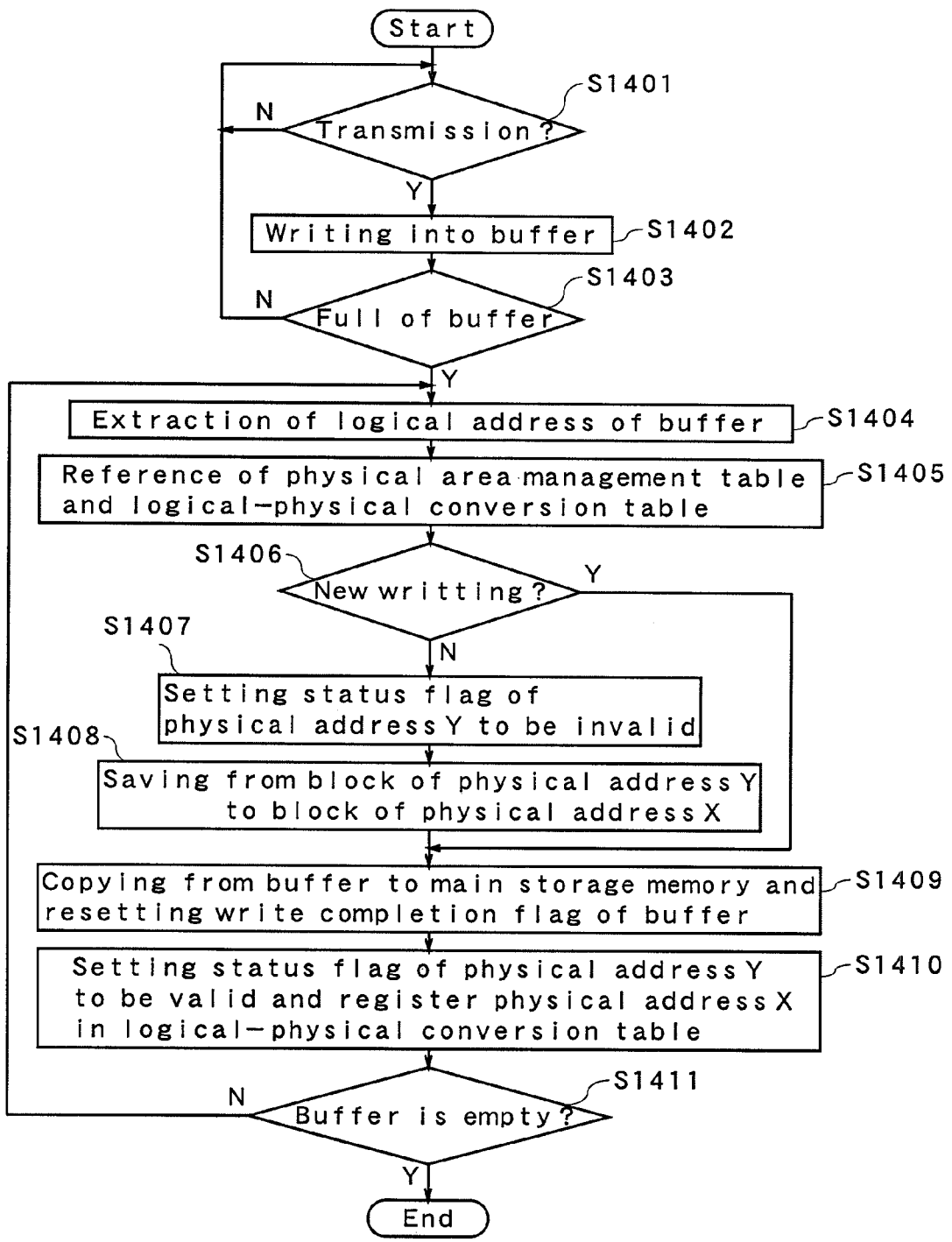
FIG. 14 is a flowchart showing a write procedure of the cluster data in the main storage memory of the first embodiment.
Figure 15:
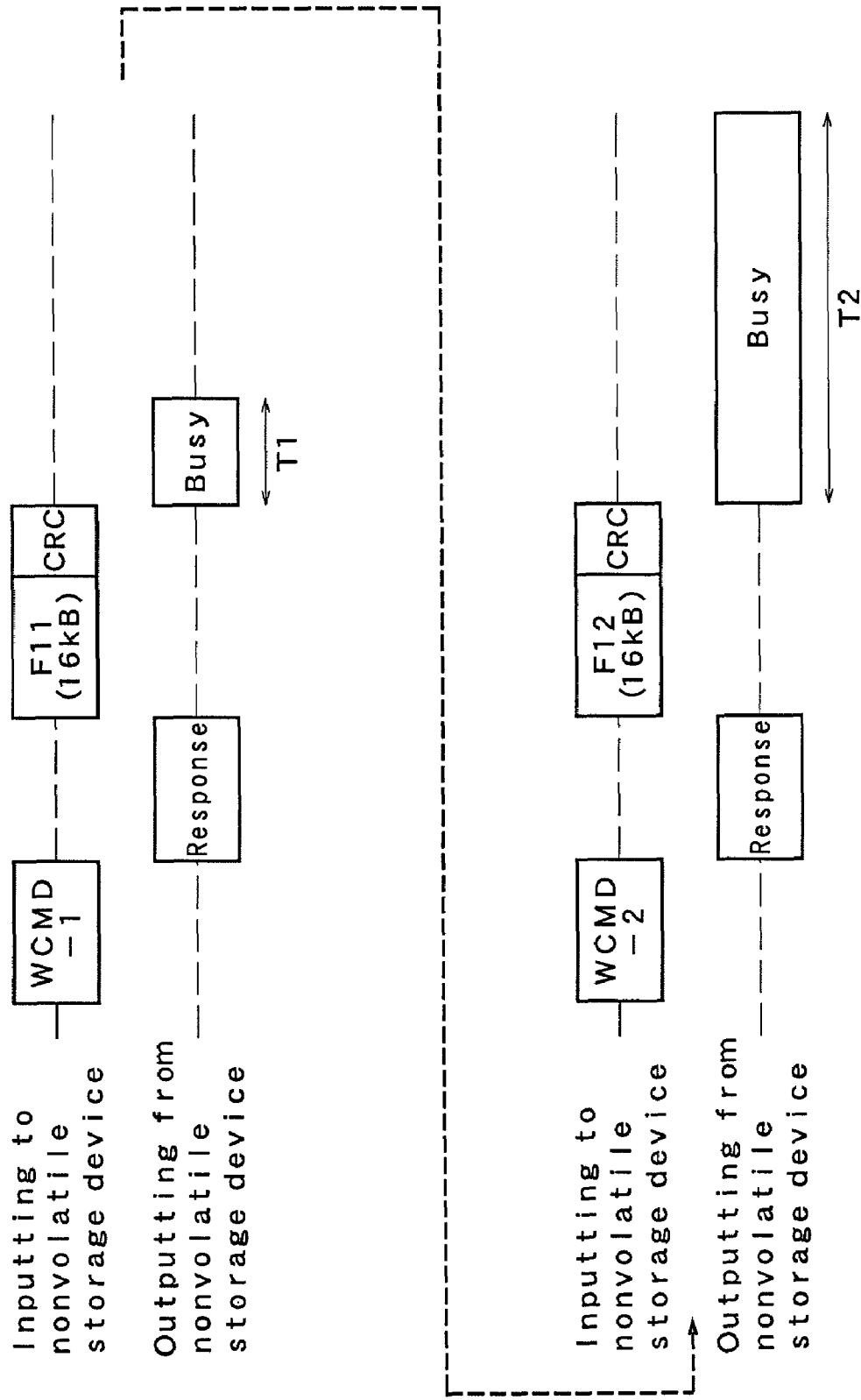
FIG. 15 is a time chart showing a data transfer of an access device and a nonvolatile storage device.

In order to better understand the data rewrite processing according to the present embodiment, processing of the first read-write control part 112 and the second read-write control part 107 will be explained in detail using FIG. 14.

When the access device 100 issues a data write command for one cluster (this accompanies data transfer) to the main storage memory based on the FAT file system (S1401), firstly, data of one cluster and the logical address are written in the buffer 106 and the write completion flag is set to a value of 1 (S1402).

The above processing is repeated until the buffer 106 is filled with data (S1403).

At the time when the buffer 106 is filled with data, contents of the buffer 106 is checked, and a logical address whose write completion flag is set to a value of 1 is extracted (S1404). For example, as shown in FIG. 12, when all the data in the buffer 106 is of logical block addresses corresponding to the address range of one physical block, the logical-physical conversion table 110 is referred to, and it is checked whether the old data exists in the physical addresses corresponding to the logical block address based on the logical block addresses.

Specifically, if the value of 1FFF in hexadecimal is stored in an area corresponding to the physical block address of the logical-physical conversion table 110, it is determined that new data is written therein. If the logical-physical conversion table 110 stores a physical address other than the value of 1FFF, it is determined that the physical address is a physical address Y in which old data exists.

Thereafter, the physical area management table 109 is searched to extract an invalid block (physical address X) (S1405).

If an area corresponding to the logical block address in the logical-physical conversion table 110 stores the physical address other than the value of 1FFF, i.e., it is not new data writing, old data exists in the logical block address, and will be rewritten by the new data (No of S1406).

In this case, a status flag corresponding to the physical address Y of the physical area management table 109 is set to be an invalid state (S1407). Continuously, the data in the block at the physical address Y is saved in a block at the address X (S1408). This processing corresponds to the saving processing from the PBA 5 to the PBA1 in FIG. 12, i.e., the processing shown by the "dashed line arrows." In FIG. 12, the PBA1 corresponds to the physical address X and the PBA 5 corresponds to the physical address Y.

After the above-mentioned processing or at a time of writing new data in S1406, the cluster data is transferred from the buffer 106 to the nonvolatile main storage memory 114, and the write completion flag corresponding to the transferred data is reset to a value of 0 in the buffer 106 (S1409).

Finally, a status flag corresponding to the physical address X in the physical area management table 109 is set to be a valid state, and further, the physical address X is registered in the logical-physical conversion table 110 (S1410).

The above processing continues to be executed until all the data in the buffer 106 have been transferred to the nonvolatile main storage memory 114 (S1411).

Processing from S1401 to S1404 is mainly processing of the second read-write control part 107, and processing from S1405 to S1411 is mainly processing of the first read-write control part 112.

A data transfer between the access device 100 and the nonvolatile storage device 115 when the rewrite processing of the cluster data described above is executed will be explained using FIG. 15.

Naturally, the access device 100 and the nonvolatile storage device 115 execute the data transfer while checking mutual progress of the processing.

Firstly, the access device 100 transfers the write command WCMD-1 to the nonvolatile storage device 115. The nonvolatile storage device 115 returns a response to the access device 100 in order to notify that the nonvolatile storage device 115 received the WCMD-1. The logical address of the data to be transferred is set on an argument of the WCMD-1.

After receiving the response, the access device 100 transfers the data F11 of one cluster and a CRC code for error protection to the nonvolatile storage device 15. On the other hand, the read-write control section 107 in the nonvolatile storage device 115 writes the data F11 and the logical address in the buffer 106. A writing period required for this writing corresponds to a busy period T1 in FIG. 15.

In the present embodiment, since the buffer 106 is not composed of a volatile RAM such as the SRAM, but FeRAM, which is the nonvolatile RAM, and it is so configured that the buffer 106 stores the logical address in it, at the time when the data writing to the buffer 106 is completed, i.e., at the time of completion of the busy period T1, the access device 100 can determine that the data is written correctly.

The access device 100 recognizes an end of the busy period T1, and in order to write the data F12 next, the access device 100 transfers the write command WCMD-2 to the nonvolatile storage device 115. Then, the same processing as that of the WCMD-1 described above is performed. Since the buffer 106 becomes full at completion of writing of the F12, the access device 100 starts to transfer data of two clusters from the buffer 106 to the nonvolatile main storage memory 114 at this time. A busy period T2 needs to be longer than the busy period T1 in order to correspond to a period from the beginning of writing of the data F12 until completion of the transfer.

Regarding a transfer mode between the access device 100 and the nonvolatile storage device 115 described above, it is assumed that the buffer 106 is composed of the volatile RAM.

In this case, even when the data writing in the buffer 106 is completed, if the power supply shutdown takes place before the data is written in the nonvolatile main storage memory 114, the data will be lost. Contrary to this, if the buffer 106 is the nonvolatile RAM like the present embodiment, even if it is determined that the access device 100 has completed the writing at the time when the writing in the buffer 106 is completed, it causes no problem. Accordingly, handling of data between the access device 100 and the buffer 106 can be performed smoothly.

Therefore, even if the nonvolatile storage device 115 of the present embodiment is connected to the vehicle carried type access device 100 such as for an automobile, and there takes place voltage drop that is very like the power supply shutdown in situation when starting the engine, it will work without any problem at all.

Now, a rewriting speed of the conventional nonvolatile storage device and that of the nonvolatile storage device in the present embodiment of the present invention will be compared.

As shown in FIG. 11, in rewriting data of four clusters based on a command from the FAT file system, four times of writing and 28 times of saving processing in units of clusters are necessary in the conventional nonvolatile storage device. In addition, erase processing of invalid blocks, namely, erase processing of four physical blocks of the PBA1, PBA33, PBA8, and PBA55 is necessary before writing.

Suppose the main storage memory 114 substantially consists of NAND type flash memory with a physical block size of 128 k bytes and with a page size of 2 k bytes, a write busy time for writing one page is usually approximately 200 to 300 μsec. Since a data transfer time of the data to the main storage memory 114 is added to this time, it is thought to take approximately 500 μsec from start of writing to its end.

Since saving processing needs time for reading a physical block which is a transformation source, saving time for one page may be considered approximately 700 μsec in general. Moreover, an erase busy time may be considered 2 msec.

In order to simplify the calculation, it is assumed that the internal-processing time of the memory controller 113 etc. other than processing time in the flash memory can be ignored. On this assumption, time required to rewrite the data corresponding to the whole write commands WCMD-1 to WCMD-4 can be calculated by Formula (1), giving approximately 180 msec.

$$\text{Time to rewrite one cluster (eight pages) for four times} + \quad (1)$$
$$\text{time to save one cluster for 28 times} +$$
$$\text{time to erase the physical block for four times} =$$
$$(500 \text{ μsec} \times 8 \times 4) + (700 \text{ μsec} \times 8 \times 28) + (2 \text{ msec} \times 4) \approx 180 \text{ msec}$$

On the other hand, in the nonvolatile storage device of the present embodiment, as shown in FIG. 12, it is enough that the number of write times in a cluster unit is 4 and the number of times of saving processing is 12. Besides, the erase processing of the invalid blocks is required only for the two physical blocks, the PBA1 and PBA33.

However, the read and write processing from and in the buffer 106 which was not executed conventionally becomes necessary. A size of the buffer 106 becomes 32960 bytes from FIG. 13 and Formula (2).

$$(512 \text{ bytes} + \text{approximately 3 bytes}) \times 64 = 32960 \text{ bytes} \quad (2)$$

However, basic specifications of FeRAM which constitutes the buffer 106 are shown in the following table 1 as compared with those of the flash memory.

TABLE 1

|  | Flash memory | FeRAM |
| --- | --- | --- |
| Memory type | Nonvolatile (10 years) | Nonvolatile (10 years) |
| Data rewrite unit | 512 to 2 k bytes | One to several Bytes |
| Write cycle | Several hundreds μs | 100 ns |
| Guaranteed number of rewriting | One hundred thousand times | Ten billion times |
| Overwriting | Impossible | Possible |

Here, it is shown that each memory is of nonvolatile type and an each memory holding time is ten years. Since an access time per one byte is 100 nsec as shown in table 1 if the FeRAM of these specifications is used, time required to write and read the whole buffer 106 is determined as approximately 3.3 msec from Formula (3).

$$32960 \text{ bytes} \times 100 \text{ nsec} \approx 3.3 \text{ msec} \quad (3)$$

Assuming that the specifications of the flash memory are the same as those mentioned above, Formula (4) shows that time required for the data rewriting of the whole write commands WCMD-1 to WCMD-4 becomes approximately 90 msec.

$$\text{Time to rewrite one cluster (eight pages for 4 times)} + \quad (4)$$
$$\text{time to save one cluster for 12 times} +$$
$$\text{time to erase the physical block for two times} +$$
$$\text{time to read and write from and in the buffer 106} =$$
$$(500 \text{ μsec} \times 8 \times 4) + (700 \text{ μsec} \times 8 \times 12) +$$
$$(2 \text{ msec} \times 2) + 3.3 \text{ msec} \approx 90 \text{ msec}$$

Therefore, it becomes possible for the nonvolatile storage device in the present embodiment to attain a writing speed approximately twice as fast as that of the conventional nonvolatile storage device based on the "rewriting technique on the premise of saving data".

Next, a second embodiment of a nonvolatile storage system according to the present invention will be explained.

The present embodiment differs largely from the first embodiment in that, when data of two clusters temporarily stored in the buffer 106 is collectively written in the main storage memory 114, a "transfer success flag" is created based on a "write completion signal (ready/busy signal)" and a "status signal" outputted from the main storage memory 114, and it is determined whether new data transferred from the access device 100 can be overwritten in the buffer 106 based on the transfer success flag.

Figure 16:
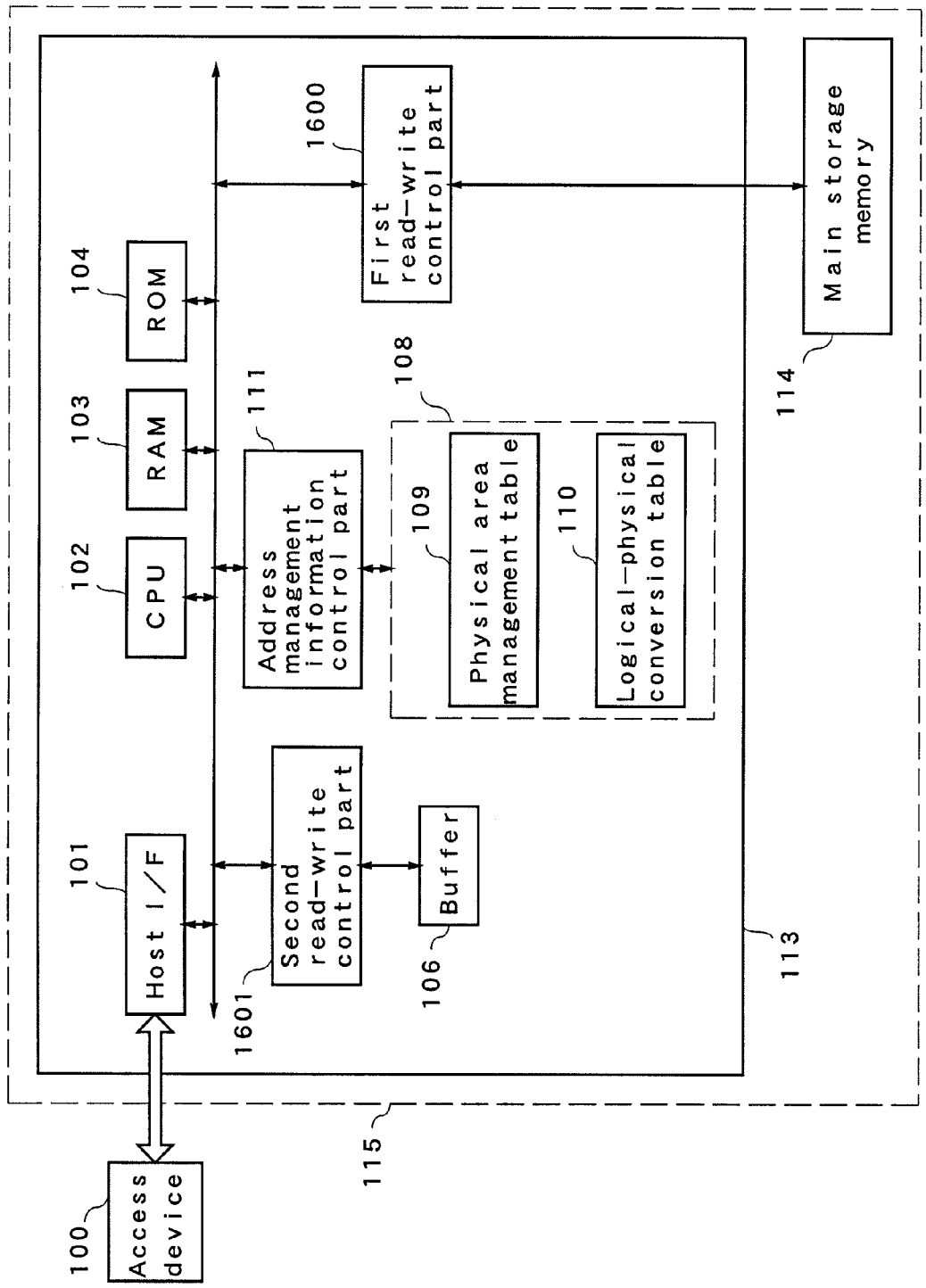
FIG. 16 is a block diagram of the nonvolatile storage system according to a second embodiment of the present invention.

FIG. 16 is a block diagram of the nonvolatile storage system according to the present embodiment.

In a case of the present embodiment, the main storage memory 114 outputs a write completion signal indicating that the data writing to the main storage memory 114 is completed to a system bus. If the value of the write completion signal is 0, the data is being written in the main storage memory 114 (busy state); if the value is 1, the writing of the data is completed (ready state).

In addition, the main storage memory 114 outputs the status signal indicating a write state at the time of completion of the data writing. When a value of the status signal is 0, it means that the data was correctly written in the main storage memory 114; and when the value is 1, it means that the data was not correctly written.

Substantially similar to the first embodiment, a first read-write control section 1600 writes data stored in the buffer 106 temporarily into the main storage memory 114, and reads the data in the main storage memory 114. In addition, the first read-write control section 1600 reads the status signal from the main storage memory 114.

Substantially similar to the first embodiment, a second read-write control section 1601 writes the data transferred from the access device 100 in the buffer 106, and simultaneously reads a plurality of data in the buffer 106. In addition, the second read-write control section 1601 creates the transfer success flag based on the write completion signal from the main storage memory 114 and a status signal read by the first read-write control section 1600. The transfer success flag indicates that the data writing from the buffer 106 to the main storage memory 114 is successful; a value of 1 indicates a successful transfer and a value of 0 indicates a failed transfer. For example, if the data transfer from the buffer 106 to the main storage memory 114 is successful, the write completion signal=1 and the status signal=0, and at this time the transfer success flag=1.

Other configurations of the nonvolatile storage system 113 are substantially similar to those of the first embodiment.

Figure 17:
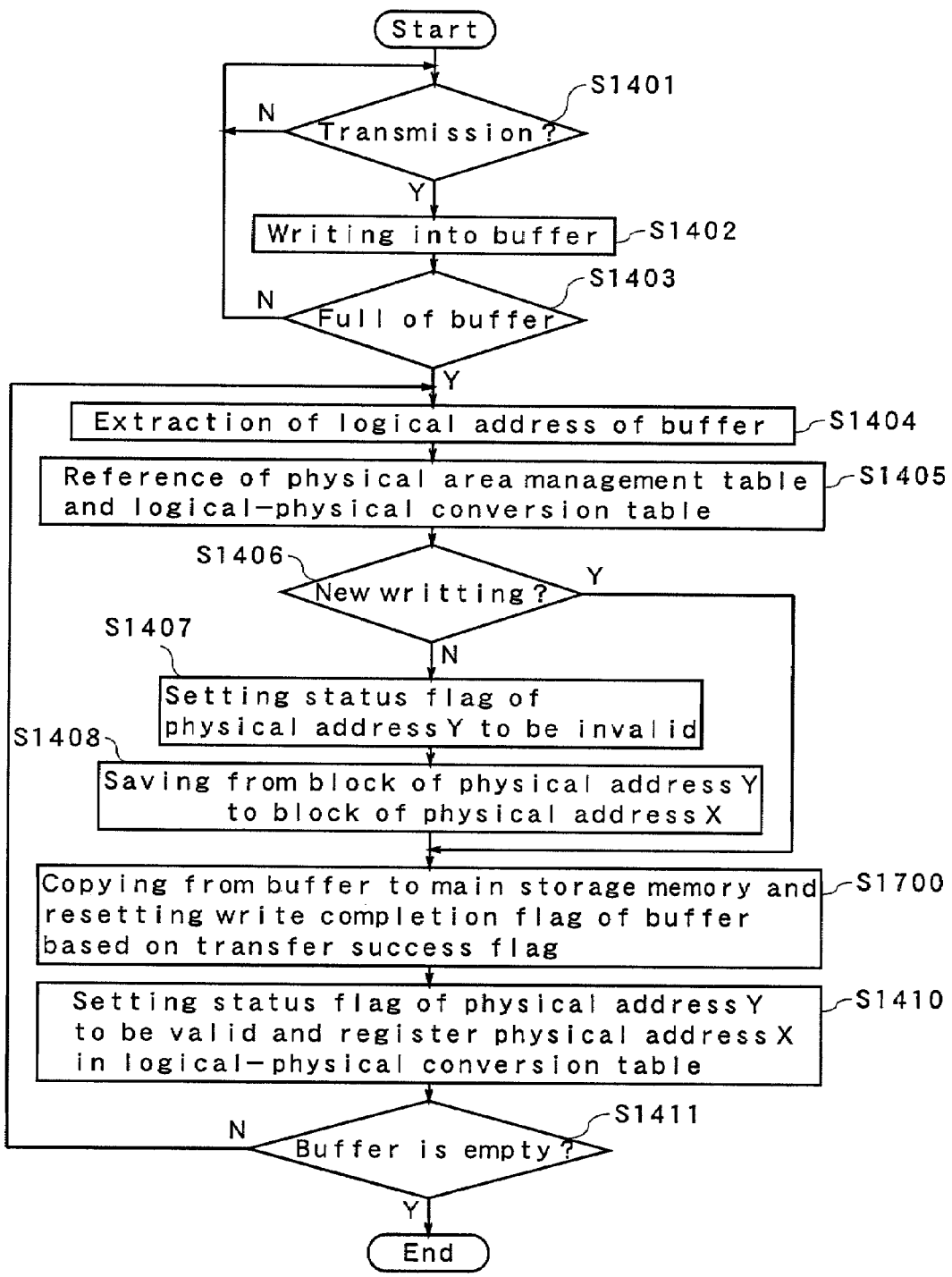
FIG. 17 is a flowchart showing a write procedure of the cluster data in the main storage memory according to the second embodiment.

Operations of the nonvolatile storage system according to the present embodiment configured as described above will be explained based on FIG. 16 and FIG. 17. Since basic operations thereof are the same as those of the first embodiment, only different points will be described.

First, when the access device 100 transfers data of one cluster, the second read-write control section 1601 writes the data in the buffer 106 to make the data to be temporarily stored. When the data writing to the buffer 106 is completed, the write completion flag in the buffer 106 (see FIG. 13) is set to a value of 1.

Thereafter, at the time when the buffer 106 has become full (at the time of data of two clusters being written), the second read-write control section 1601 reads collectively the data of two clusters in the buffer 106 and writes them in the main storage memory 114 through the first read-write control section 1600. If this transfer work is completed normally, the status signal from the main storage memory 114 becomes a value of 0 (being written in correctly), and the write completion signal becomes a value of 1 (being a ready state).

The second read-write control section 1601 creates the transfer success flag (=1) using these write completion signal (=1) and status signal (=0). The created transfer success flag is retained in the register provided in the interior of the second read-write control section 1601.

Next, when the value of the transfer success flag in a register is 1, i.e., in the case where transfer succeeds, the second read-write control section 1601 resets the write completion flag (=0) of the buffer 106. (S1700 of FIG. 17)

When the access device 100 issues a write command of data again, the second read-write control section 1601 overwrites the new data from the access device 100 in the buffer 106 only in the case of the write completion flag in the buffer 106 indicates 0.

Contrary to what was described above, when the data is transferred from the buffer 106 to the main storage memory 114, if any write error takes place in the main storage memory 114, a value of the status signal becomes 1. If there takes place the power supply shutdown during the data transfer, the write completion signal remains in the busy state (=0). In that case, the second read-write control section 1601 creates the transfer success flag with a value of 0 (failure). In addition, if the transfer success flag retained in the register is a value of 0, the second read-write control section 1601 does not reset the write completion flag in the buffer 106 (retaining it in a value of 1).

In this state, if the access device 100 issues a write command of new data, since the write completion flag of the buffer 106 has been set, the second read-write control section 1601 refuses data writing operations from the access device 100, and writes again the data stored on the buffer 106 into the main storage memory 114 through the first read-write control section 1600.

As described above, since the transfer success flag is created depending on whether the transfer to the main storage memory 114 is successful and the writing of new data in the buffer 106 is controlled based on this transfer success flag, operations of the nonvolatile storage system become sure even when there takes place abnormalities, such as power supply shutdown and the writing error to the main storage memory 114, etc., and accordingly its reliability is improved. If such a "write judgment to the buffer 106" is not executed; although normal data transfer to the main storage memory 114 from the buffer 106 is not executed because of the power supply shutdown etc., there is a possibility that the buffer 106 will be overwritten and valid data will be lost.

Note that the present invention is not restricted to the above mentioned embodiments.

For example, the size of the buffer 106 is specified to be two clusters, it will be satisfactory if the size is larger than or equal to the cluster size in the main storage memory, i.e., being at least equal to or more than two clusters. For example, if the current size is enlarged to a size equivalent to four clusters, it becomes possible to buffer four consecutive clusters and further write them in the physical blocks in the main storage memory 114.

Moreover, for the buffer 106, in addition to the ferroelectric memory (FeRAM), various types of nonvolatile RAMs can be adopted, such as the magnetic random access memory (MRAM), ovonic unified memory (OUM), and resistance RAM (RRAM), any types of nonvolatile RAMs that will be put in practical use in future are not intended to be excluded.

In the present embodiment, although a way of writing data in units of clusters in conformance with the FAT file system is illustrated and explained, the embodiments are not restricted to this, that is, this technique is effective even when the cluster data is written without using the FAT file system.

INDUSTRIAL APPLICABILITY

The memory controller, the nonvolatile storage device, and the nonvolatile storage system according to the present invention are devices that use a nonvolatile memory as the main storage memory, such as a flash memory whose erase size is larger than a cluster size and uses a nonvolatile RAM as a buffer (auxiliary storage memory). The present invention can perform high-speed data writing related to such a device. The device according to the present invention can be used as portable AV devices, such as a still image recording reproduction apparatus and a video recording reproduction apparatus, or a recording medium of portable communication devices such as a cellular phone.

The invention claimed is:

1. A memory controller for reading data from a nonvolatile main storage memory in which an erase size is larger than a cluster size and writing data given from the outside into the main storage memory, comprising:

a first read-write control part for controlling reading and writing of data to said main storage memory;

a nonvolatile auxiliary storage memory which includes data areas and write completion flags showing whether data is written into said data area, for temporarily storing data before being written in said main storage memory; and a second read-write control part for collectively reading a plurality of data temporarily stored in said auxiliary storage memory and writing them to said main storage memory through said first read-write control part and for resetting the write completion flag in every writing units where said data is actually written.

2. The memory controller according to claim 1, wherein said main storage memory outputs a write completion signal indicating that data writing in said main storage memory is completed and a status signal indicating a state of the data writing in said main storage memory, and said second read-write control part creates a transfer success flag indicating that the data writing from the auxiliary storage memory to the main storage memory is successful based on said write completion signal and status signal and writes new data into said auxiliary storage memory based on the transfer success flag.

3. A nonvolatile storage device which comprises: a nonvolatile main storage memory having a plurality of erase blocks whose size is larger than a cluster size; and a memory controller for reading data from said main storage memory and wring data given from the outside into said main storage memory, wherein
said memory controller includes:
a first read-write control part for controlling reading and writing of data to said main storage memory;
a nonvolatile auxiliary storage memory which includes data areas and write completion flags showing whether data is written into said data area, for temporarily storing data before being written in said main storage memory; and
a second read-write control part for collectively reading a plurality of data temporarily stored in said auxiliary storage memory and writing them to said main storage memory through said first read-write control part and for resetting said write completion flag in every writing units where the data is actually written.

4. The nonvolatile storage device according to claim 3, wherein
said main storage memory outputs a write completion signal indicating that data writing in said main storage memory is completed and a status signal indicating a state of the data writing in said main storage memory, and
said second read-write control part creates a transfer success flag indicating that the data writing from the auxiliary storage memory to the main storage memory is successful based on said write completion signal and status signal and writes new data into said auxiliary storage memory based on the transfer success flag.

5. A nonvolatile storage system comprising: a nonvolatile main storage memory; a memory controller; and an access device, wherein
said memory controller reads data stored in said main storage memory and writes data into the main storage memory according to said given logical address, and wherein
said main storage memory includes: a plurality of erase blocks whose size is larger than a cluster size, and
said memory controller includes:
a first read-write control part for controlling reading and writing of data to said main storage memory;
a nonvolatile auxiliary storage memory which includes data areas and write completion flags showing whether data is written into said data area, for temporarily storing data before being written in said main storage memory; and
a second read-write control part for collectively reading a plurality of data temporarily stored in said auxiliary storage memory and writing them to said main storage memory through said first read-write control part and for resetting the write completion flag in every writing units where said data is actually written.

6. The nonvolatile storage system according to claim 5, wherein
said main storage memory outputs a write completion signal indicating that data writing in said main storage memory is completed and a status signal indicating a state of the data writing in said main storage memory, and
said second read-write control part creates a transfer success flag indicating that the data writing from the auxiliary storage memory to the main storage memory is successful based on said write completion signal and status signal and writes new data into said auxiliary storage memory based on the transfer success flag.

* * * * *